(12) United States Patent
Aziz et al.

(10) Patent No.: US 8,539,582 B1
(45) Date of Patent: Sep. 17, 2013

(54) MALWARE CONTAINMENT AND SECURITY ANALYSIS ON CONNECTION

(75) Inventors: Ashar Aziz, Menlo Park, CA (US); Wei-Lung Lai, Menlo Park, CA (US); Jayaraman Manni, Menlo Park, CA (US)

(73) Assignee: FireEye, Inc., Milpitas, CA (US)

(*) Notice: Subject to any disclaimer, the term of this patent is extended or adjusted under 35 U.S.C. 154(b) by 1074 days.

(21) Appl. No.: 11/717,408

(22) Filed: Mar. 12, 2007

Related U.S. Application Data

(63) Continuation-in-part of application No. 11/494,990, filed on Jul. 28, 2006, now Pat. No. 8,375,444, which is a continuation-in-part of application No. 11/471,072, filed on Jun. 19, 2006, which is a continuation-in-part of application No. 11/409,355, filed on Apr. 20, 2006, now Pat. No. 8,171,553, which is a continuation-in-part of application No. 11/096,287, filed on Mar. 31, 2005, and a continuation-in-part of application No. 11/151,812, filed on Jun. 13, 2005, and a continuation-in-part of application No. 11/152,286, filed on Jun. 13, 2005.

(60) Provisional application No. 60/559,198, filed on Apr. 1, 2004, provisional application No. 60/579,953, filed on Jun. 14, 2004, provisional application No. 60/579,910, filed on Jun. 14, 2004.

(51) Int. Cl.
*G08B 23/00* (2006.01)
*H04L 29/06* (2006.01)

(52) U.S. Cl.
USPC .............................................. 726/24; 713/150

(58) Field of Classification Search
USPC ........ 726/22–25, 26, 12.13, 15, 16; 713/200, 713/201
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 | 1/2008 |
| WO | 200206928 A2 | 1/2002 |

(Continued)

OTHER PUBLICATIONS

IEEE Xplore Digital Library Search results for "detection of unknown computer worms". http://ieeexplore.ieee.org/search/searchresult.jsp?SortField=Score&SortOrder=desc&ResultC . . . Accessed on Aug. 28, 2009.

(Continued)

*Primary Examiner* — Eleni Shiferaw
*Assistant Examiner* — Abu Sholeman
(74) *Attorney, Agent, or Firm* — Blakely, Sokoloff, Taylor & Zafman LLP

(57) ABSTRACT

Systems and methods for malware containment and security analysis on connection are provided. Digital devices are quarantined for a predetermined period of time upon connection to the communication network. When a digital device is quarantined, all network data transmitted by the digital device is directed to a controller which then analyzes the network data to identify unauthorized activity and/or malware within the newly connected digital device. An exemplary method to contain malware includes detecting a digital device upon connection with a communication network, quarantining network data from the digital device for a predetermined period of time, transmitting a command to the digital device to activate a security program to identify security risks, and analyzing the network data to identify malware within the digital device.

42 Claims, 7 Drawing Sheets

(56) References Cited

U.S. PATENT DOCUMENTS

| | | | |
|---|---|---|---|
| 5,440,723 A | 8/1995 | Arnold et al. | |
| 5,657,473 A | 8/1997 | Killean et al. | |
| 5,842,002 A | 11/1998 | Schnurer et al. | |
| 5,978,917 A | 11/1999 | Chi | |
| 6,094,677 A | 7/2000 | Capek et al. | |
| 6,269,330 B1 | 7/2001 | Cidon et al. | |
| 6,298,445 B1 | 10/2001 | Shostack | |
| 6,357,008 B1 | 3/2002 | Nachenberg | |
| 6,424,627 B1 | 7/2002 | Sørhaug et al. | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |
| 6,898,632 B2 | 5/2005 | Gordy | |
| 6,981,279 B1 | 12/2005 | Arnold et al. | |
| 7,007,107 B1 | 2/2006 | Ivchenko et al. | |
| 7,043,757 B2 | 5/2006 | Hoefelmeyer et al. | |
| 7,069,316 B1 | 6/2006 | Gryaznov | |
| 7,080,408 B1* | 7/2006 | Pak et al. | 726/24 |
| 7,093,239 B1 | 8/2006 | van der Made | |
| 7,100,201 B2 | 8/2006 | Izatt | |
| 7,159,149 B2 | 1/2007 | Spiegel | |
| 7,231,667 B2 | 6/2007 | Jordan | |
| 7,240,364 B1 | 7/2007 | Branscomb et al. | |
| 7,240,368 B1 | 7/2007 | Roesch | |
| 7,287,278 B2 | 10/2007 | Liang | |
| 7,308,716 B2 | 12/2007 | Danford et al. | |
| 7,356,736 B2 | 4/2008 | Natvig | |
| 7,386,888 B2 | 6/2008 | Liang | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,480,773 B1 | 1/2009 | Reed | |
| 7,487,543 B2 | 2/2009 | Arnold et al. | |
| 7,496,960 B1 | 2/2009 | Chen | |
| 7,496,961 B2 | 2/2009 | Zimmer et al. | |
| 7,519,990 B1 | 4/2009 | Xie | |
| 7,523,493 B2 | 4/2009 | Liang | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa | |
| 7,639,714 B2 | 12/2009 | Stolfo et al. | |
| 7,644,441 B2 | 1/2010 | Schmidt | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,849,506 B1 | 12/2010 | Dansey et al. | |
| 7,904,959 B2 | 3/2011 | Sidiroglou et al. | |
| 7,908,660 B2 | 3/2011 | Bahl | |
| 7,996,556 B2 | 8/2011 | Raghavan et al. | |
| 7,996,836 B1* | 8/2011 | McCorkendale et al. | 718/1 |
| 7,996,905 B2 | 8/2011 | Arnold et al. | |
| 8,006,305 B2 | 8/2011 | Aziz | |
| 8,010,667 B2* | 8/2011 | Zhang et al. | 709/224 |
| 8,028,338 B1 | 9/2011 | Schneider et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,201,246 B1 | 6/2012 | Wu et al. | |
| 8,204,984 B1 | 6/2012 | Aziz et al. | |
| 8,220,055 B1 | 7/2012 | Kennedy | |
| 8,233,882 B2* | 7/2012 | Rogel | 455/411 |
| 8,239,944 B1 | 8/2012 | Nachenberg et al. | |
| 8,291,499 B2* | 10/2012 | Aziz et al. | 726/24 |
| 8,307,443 B2* | 11/2012 | Wang et al. | 726/24 |
| 8,375,444 B2 | 2/2013 | Aziz et al. | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland, III | |
| 2002/0162015 A1* | 10/2002 | Tang | 713/200 |
| 2002/0184528 A1 | 12/2002 | Shevenell | |
| 2002/0188887 A1* | 12/2002 | Largman et al. | 714/13 |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron | |
| 2003/0200460 A1 | 10/2003 | Morota et al. | |
| 2003/0212902 A1 | 11/2003 | van der Made | |
| 2003/0237000 A1 | 12/2003 | Denton et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0083408 A1 | 4/2004 | Spiegel | |
| 2004/0111531 A1 | 6/2004 | Staniford et al. | |
| 2004/0165588 A1 | 8/2004 | Pandya | |
| 2004/0236963 A1 | 11/2004 | Danford et al. | |
| 2004/0243349 A1 | 12/2004 | Greifeneder | |
| 2004/0249911 A1 | 12/2004 | Alkhatib | |
| 2004/0268147 A1 | 12/2004 | Wiederin et al. | |
| 2005/0033960 A1 | 2/2005 | Vialen et al. | |
| 2005/0033989 A1 | 2/2005 | Poletto | |
| 2005/0086523 A1 | 4/2005 | Zimmer et al. | |
| 2005/0091513 A1 | 4/2005 | Mitomo | |
| 2005/0114663 A1 | 5/2005 | Cornell | |
| 2005/0125195 A1 | 6/2005 | Brendel | |
| 2005/0157662 A1 | 7/2005 | Bingham et al. | |
| 2005/0183143 A1 | 8/2005 | Anderholm | |
| 2005/0201297 A1* | 9/2005 | Peikari | 370/242 |
| 2005/0210533 A1 | 9/2005 | Copeland | |
| 2005/0238005 A1* | 10/2005 | Chen et al. | 370/389 |
| 2005/0265331 A1 | 12/2005 | Stolfo | |
| 2006/0015715 A1 | 1/2006 | Anderson | |
| 2006/0021054 A1 | 1/2006 | Costa et al. | |
| 2006/0047665 A1* | 3/2006 | Neil | 707/10 |
| 2006/0075496 A1 | 4/2006 | Carpenter et al. | |
| 2006/0095968 A1 | 5/2006 | Portolani | |
| 2006/0101516 A1 | 5/2006 | Sudaharan | |
| 2006/0101517 A1* | 5/2006 | Banzhof et al. | 726/25 |
| 2006/0117385 A1 | 6/2006 | Mester et al. | |
| 2006/0123477 A1 | 6/2006 | Raghavan | |
| 2006/0143709 A1 | 6/2006 | Brooks et al. | |
| 2006/0161983 A1 | 7/2006 | Cothrell | |
| 2006/0161987 A1 | 7/2006 | Levy-Yurista | |
| 2006/0164199 A1* | 7/2006 | Gilde et al. | 336/234 |
| 2006/0184632 A1 | 8/2006 | Marino et al. | |
| 2006/0191010 A1 | 8/2006 | Benjamin | |
| 2006/0221956 A1 | 10/2006 | Narayan et al. | |
| 2006/0288417 A1 | 12/2006 | Bookbinder et al. | |
| 2007/0006288 A1* | 1/2007 | Mayfield et al. | 726/5 |
| 2007/0006313 A1 | 1/2007 | Porras et al. | |
| 2007/0016951 A1 | 1/2007 | Piccard | |
| 2007/0033645 A1 | 2/2007 | Jones | |
| 2007/0038943 A1* | 2/2007 | FitzGerald et al. | 715/752 |
| 2007/0064689 A1* | 3/2007 | Shin et al. | 370/389 |
| 2007/0094730 A1 | 4/2007 | Bhikkaji et al. | |
| 2007/0157306 A1 | 7/2007 | Elrod et al. | |
| 2007/0171824 A1 | 7/2007 | Ruello et al. | |
| 2007/0174915 A1 | 7/2007 | Gribble et al. | |
| 2007/0192500 A1 | 8/2007 | Lum | |
| 2007/0192858 A1* | 8/2007 | Lum | 726/22 |
| 2007/0198275 A1 | 8/2007 | Malden et al. | |
| 2007/0250930 A1 | 10/2007 | Aziz et al. | |
| 2007/0271446 A1 | 11/2007 | Nakamura | |
| 2008/0005782 A1* | 1/2008 | Aziz | 726/3 |
| 2008/0072326 A1 | 3/2008 | Danford et al. | |
| 2008/0080518 A1 | 4/2008 | Hoeflin et al. | |
| 2008/0120722 A1 | 5/2008 | Sima et al. | |
| 2008/0134334 A1 | 6/2008 | Kim et al. | |
| 2008/0141376 A1 | 6/2008 | Clausen | |
| 2008/0184373 A1* | 7/2008 | Traut et al. | 726/26 |
| 2008/0222729 A1 | 9/2008 | Chen et al. | |

| | | | |
|---|---|---|---|
| 2008/0263665 | A1 | 10/2008 | Ma et al. |
| 2008/0295172 | A1 | 11/2008 | Bohacek |
| 2008/0301810 | A1 | 12/2008 | Lehane |
| 2008/0320594 | A1* | 12/2008 | Jiang .............................. 726/24 |
| 2009/0007100 | A1* | 1/2009 | Field et al. ..................... 718/1 |
| 2009/0031423 | A1 | 1/2009 | Liu et al. |
| 2009/0032858 | A1* | 2/2009 | Huang et al. ................. 257/314 |
| 2009/0083369 | A1 | 3/2009 | Marmor |
| 2009/0083855 | A1 | 3/2009 | Apap et al. |
| 2009/0089879 | A1 | 4/2009 | Wang |
| 2009/0094697 | A1 | 4/2009 | Provos et al. |
| 2009/0193293 | A1 | 7/2009 | Stolfo et al. |
| 2009/0241190 | A1 | 9/2009 | Todd et al. |
| 2009/0271867 | A1 | 10/2009 | Zhang |
| 2009/0300761 | A1 | 12/2009 | Park et al. |
| 2009/0328221 | A1 | 12/2009 | Blumfield et al. |
| 2010/0043073 | A1* | 2/2010 | Kuwamura ..................... 726/24 |
| 2010/0054278 | A1 | 3/2010 | Stolfo et al. |
| 2010/0058474 | A1 | 3/2010 | Hicks |
| 2010/0077481 | A1 | 3/2010 | Polyakov et al. |
| 2010/0083376 | A1 | 4/2010 | Pereira |
| 2010/0115621 | A1 | 5/2010 | Staniford et al. |
| 2010/0192223 | A1 | 7/2010 | Ismael et al. |
| 2010/0251104 | A1 | 9/2010 | Massand |
| 2010/0281102 | A1 | 11/2010 | Chinta et al. |
| 2010/0281541 | A1 | 11/2010 | Stolfo et al. |
| 2010/0281542 | A1 | 11/2010 | Stolfo et al. |
| 2010/0287260 | A1 | 11/2010 | Peterson et al. |
| 2011/0047620 | A1 | 2/2011 | Mahaffey et al. |
| 2011/0078794 | A1 | 3/2011 | Manni et al. |
| 2011/0093951 | A1 | 4/2011 | Aziz |
| 2011/0099633 | A1 | 4/2011 | Aziz |
| 2011/0247072 | A1 | 10/2011 | Staniford et al. |
| 2011/0307955 | A1 | 12/2011 | Kaplan et al. |
| 2011/0314546 | A1 | 12/2011 | Aziz et al. |
| 2012/0079596 | A1 | 3/2012 | Thomas et al. |
| 2012/0084859 | A1 | 4/2012 | Radinsky et al. |
| 2012/0174186 | A1 | 7/2012 | Aziz et al. |
| 2012/0174218 | A1 | 7/2012 | McCoy et al. |
| 2012/0222121 | A1 | 8/2012 | Staniford et al. |

FOREIGN PATENT DOCUMENTS

| | | | |
|---|---|---|---|
| WO | WO 02/06928 | * | 1/2002 |
| WO | WO 0206928 | * | 1/2002 |
| WO | WO0223805 | A2 | 3/2002 |

OTHER PUBLICATIONS

AltaVista Advanced Search Results. "Event Orchestrator". http://www.altavista.com/web/results?itag=ody&pg=aq&aqmode=s&aqa=Event+Orchestrator . . . Accessed on Sep. 3, 2009.

AltaVista Advanced Search Results. "attack vector identifier". http://www.altavista.com/web/results?itag=ody&pg=aq&aqmode=s&aqa=attack+vector+ide . . . Accessed on Sep. 15, 2009.

Costa, M. et al. "Vigilante: End-to-End Containment of Internet Worms," SOSP '05, Oct. 23-26, 2005, Association for Computing Machinery, Inc., Brighton U.K.

Chaudet, C. et al. "Optimal Positioning of Active and Passive Monitoring Devices," International Conference on Emerging Networking Experiments and Technologies, Proceedings of the 2005 ACM Conference on Emerging Network Experiment and Technology, Oct. 2005, pp. 71-82, CoNEXT '05, Toulousse, France.

Crandall, J.R. et al., "Minos:Control Data Attack Prevention Orthognal to Memory Model," 37th International Symposium on Microarchitecture, Dec. 2004, Portland, Oregon.

Kim, H. et al., "Autograph: Toward Automated, Distributed Worm Signature Detection," Proceedings of the 13th Usenix Security Symposium (Security 2004), Aug. 2004, pp. 271-286, San Diego.

Kreibich, C. et al., "Honeycomb—Creating Intrusion Detection Signatures Using Honeypots," 2nd Workshop on Hot Topics in Networks (HotNets—11), 2003, Boston, USA.

Newsome, J. et al., "Polygraph: Automatically Generating Signatures for Polymorphic Worms," In Proceedings of the IEEE Symposium on Security and Privacy, May 2005.

Newsome, J. et al., "Dynamic Taint Analysis for Automatic Detection, Analysis, and Signature Generation of Exploits on Commodity Software," In Proceedings of the 12th Annual Network and Distributed System Security, Symposium (NDSS '05), Feb. 2005.

Singh, S. et al., "Automated Worm Fingerprinting," Proceedings of the ACM/USENIX Symposium on Operating System Design and Implementation, Dec. 2004, San Francisco, California.

Margolis, P.E., Random House Webster's "Computer & Internet Dictionary 3rd Edition," ISBN 0375703519, Dec. 1998.

Whyte et al. "DNS-Based Detection of Scannin Works in an Enterprise Network," Proceedings of the 12th Annual Network and Distributed System Security Symposium, Feb. 2005. 15 pages.

Kristoff, J. "Botnets, Detection and Mitigation: DNS-Based Techniques," NU Security Day 2005, 23 pages.

"Packet", Microsoft Computer Dictionary, Microsoft Press, Mar. 2002, 1 pg.

Final Office Action mailed Mar. 16, 2011 in U.S. Appl. No. 11/096,287, filed Mar. 31, 2005.

Final Office Action mailed Aug. 29, 2011 in U.S. Appl. No. 11/151,812, filed Jun. 13, 2005.

Non-Final Office Action mailed Aug. 31, 2010 and Notices of Allowance mailed Feb. 23, 2011 and Jun. 8, 2011 in U.S. Appl. No. 11/152,286, filed Jun. 13, 2005.

Non-Final Office Action mailed Dec. 21, 2010 and Final Office Action mailed Aug. 19, 2011 in U.S. Appl. No. 11/471,072, filed Jun. 19, 2006.

Non-Final Office Action mailed Nov. 24, 2010, Final Office Actions mailed May 10, 2011 and Aug. 23, 2011, Advisory Action mailed Jul. 26, 2011, and Notices of Allowance mailed Dec. 15, 2011 and Feb. 7, 2012 in U.S. Appl. No. 11/409,355, filed Apr. 20, 2006.

Final Office Action mailed Nov. 22, 2010 in U.S. Appl. No. 11/717,475, filed Mar. 12, 2007.

Final Office Action mailed Feb. 2, 2011 in U.S. Appl. No. 11/717,474, filed Mar. 12, 2007.

Final Office Action mailed Feb. 2, 2011 in U.S. Appl. No. 11/717,476, filed Mar. 12, 2007.

Non-Final Office Action mailed Nov. 10, 2010, Final Office Action mailed Jun. 9, 2011, and Notice of Allowance mailed Mar. 23, 2012 in U.S. Appl. No. 11/998,750, filed Nov. 30, 2007.

Non-Final Office Actions mailed May 27, 2011 and Mar. 16, 2012, and Final Office Action mailed Dec. 5, 2011 in U.S. Appl. No. 11/998,605, filed Nov. 30, 2007.

Non-Final Office Action mailed Jan. 31, 2012 in U.S. Appl. No. 11/709,570, filed Feb. 21, 2007.

Non-Final Office Action mailed Apr. 18, 2011, Final Office Action mailed Aug. 26, 2011, and Advisory Action mailed Nov. 9, 2011 in U.S. Appl. No. 12/263,971, filed Nov. 3, 2008.

U.S. Appl. No. 12/263,971, Non-Final Office Action, mailed Apr. 18, 2011.

U.S. Appl. No. 12/263,971, Final Office Action, mailed Aug. 26, 2011.

U.S. Appl. No. 12/263,971, Advisory Action, mailed Nov. 9, 2011.

U.S. Appl. No. 12/263,971, Non-Final Office Action, mailed Apr. 11, 2012.

U.S. Appl. No. 12/263,971, Final Office Action, mailed Sep. 11, 2012.

U.S. Appl. No. 12/571,294, Non-Final Office Action, mailed Jun. 25, 2012.

U.S. Appl. No. 12/571,294, Final Office Action, mailed Jan. 2, 2013.

U.S. Appl. No. 11/998,750, Non-Final Office Action, mailed Nov. 10, 2010.

U.S. Appl. No. 11/998,750, Final Office Action, mailed Jun. 9, 2011.

U.S. Appl. No. 11/998,750, Notice of Allowance, mailed Mar. 23, 2012.

U.S. Appl. No. 11/998,750, Non-Final Office Action, mailed Feb. 2, 2010.

U.S. Appl. No. 11/998,750, Final Office Action, mailed Jul. 14, 2010.

Bayer et al., "Dynamic Analysis of Malicious Code," J Comput Virol, 2006, pp. 67-77, Springer-Verlag, France.

Distler, "Malware Analysis: An Introduction," SANS Institute InfoSec Reading Room, 2007, SANS Institute.

Cohen, "PyFlag—An advanced network forensic framework," Digital investigation 5, 2008, pp. S112-S120, Elsevier.

Cohen, M.I., "PyFlag—An advanced network forensic framework," Digital investigation 5, 2008, pp. S114-S115, Elsevier.

(IN)SECURE, Oct. 2008, Issue 18.
Hjelmvik, Erik, "Passive Network Security Analysis with NetworkMiner," (IN)SECURE, Oct. 2008, pp. 18-21, Issue 18.
International Search Report and Written Opinion mailed May 10, 2012 in Application No. PCT/US12/21916.
International Search Report and Written Opinion mailed May 25, 2012 in Application No. PCT/US12/26402.
U.S. Appl. No. 11/152,286, Non-Final Office Action, mailed Aug. 31, 2010.
U.S. Appl. No. 11/152,286, Notice of Allowance, mailed Feb. 23, 2011.
U.S. Appl. No. 11/152,286, Notice of Allowance, mailed Jun. 8, 2011.
U.S. Appl. No. 11/152,286, Non-Final Office Action, mailed Apr. 2, 2009.
U.S. Appl. No. 11/152,286, Final Office Action, mailed Oct. 28, 2009.
U.S. Appl. No. 11/409,355, Non-Final Office Action, mailed Nov. 24, 2010.
U.S. Appl. No. 11/409,355, Final Office Action, mailed May 10, 2011.
U.S. Appl. No. 11/409,355, Final Office Action, mailed Aug. 23, 2011.
U.S. Appl. No. 11/409,355, Advisory Action, mailed Jul. 26, 2011.
U.S. Appl. No. 11/409,355, Notice of Allowance, mailed Dec. 15, 2011.
U.S. Appl. No. 11/409,355, Notice of Allowance, mailed Feb. 7, 2012.
U.S. Appl. No. 11/409,355, Non-Final Office Action, mailed Aug. 4, 2009.
U.S. Appl. No. 111409,355, Non-Final Office Action, mailed Aug. 8, 2008.
U.S. Appl. No. 11/409,355, Final Office Action, mailed Mar. 29, 2010.
U.S. Appl. No. 11/409,355, Final Office Action, mailed Feb. 11, 2009.
U.S. Appl. No. 11/096,287, Final Office Action, mailed Mar. 16, 2011.
U.S. Appl. No. 11/096,287, Final Office Action, mailed Oct. 26, 2009.
U.S. Appl. No. 11/096,287, Non-Final Office Action, mailed Sep. 5, 2008.
U.S. Appl. No. 11/096,287, Non-Final Office Action, mailed Feb. 12, 2009.
U.S. Appl. No. 11/096,287, Non-Final Office Action, mailed Sep. 29, 2010.
U.S. Appl. No. 11/096,287, Non-Final Office Action, mailed Jan. 16, 2013.
U.S. Appl. No. 11/151,812, Final Office Action, mailed Aug. 29, 2011.
U.S. Appl. No. 11/151,812, Final Office Action, mailed Nov. 25, 2009.
U.S. Appl. No. 11/151,812, Non-Final Office Action, mailed Mar. 30, 2011.
U.S. Appl. No. 11/151,812, Non-Final Office Action, mailed Oct. 5, 2010.
U.S. Appl. No. 11/151,812, Non-Final Office Action, mailed Apr. 2, 2009.
U.S. Appl. No. 11/494,990, Notice of Allowance, mailed Oct. 5, 2012.
U.S. Appl. No. 11/494,990, Non-Final Office Action, mailed Oct. 13, 2009.
U.S. Appl. No. 11/494,990, Final Office Action, mailed Apr. 23, 2010.
U.S. Appl. No. 11/471,072, Non-Final Office Action, mailed Dec. 21, 2010.
U.S. Appl. No. 11/471,072, Non-Final Office Action, mailed Jul. 20, 2009.
U.S. Appl. No. 11/471,072, Final Office Action, mailed May 11, 2010.
U.S. Appl. No. 11/471,072, Final Office Action, mailed Aug. 19, 2011.
U.S. Appl. No. 11/717,475, Final Office Action, mailed Nov. 22, 2010.
U.S. Appl. No. 11/717,475, Final Office Action, mailed Feb. 27, 2013.
U.S. Appl. No. 11/717,475, Non-Final Office Action, mailed Aug. 28, 2012.
U.S. Appl. No. 11/717,475, Non-Final Office Action, mailed May 6, 2010.
U.S. Appl. No. 11/717,474, Final Office Action, mailed Feb. 2, 2011.
U.S. Appl. No. 11/717,474, Non-Final Office Action, mailed May 25, 2010.
U.S. Appl. No. 11/717,476, Final Office Action, mailed Feb. 2, 2011.
U.S. Appl. No. 11/717,476, Non-Final Office Action, mailed Jun. 17, 2010.
U.S. Appl. No. 11/998,605, Non-Final Office Action, mailed May 27, 2011.
U.S. Appl. No. 11/998,605, Non-Final Office Action, mailed Mar. 16, 2012.
U.S. Appl. No. 11/998,605, Final Office Action, mailed Dec. 5, 2011.
U.S. Appl. No. 11/998,605, Non-Final Office Action, mailed Aug. 2, 2012.
U.S. Appl. No. 11/998,605, Final Office Action, mailed Jan. 8, 2013.
U.S. Appl. No. 11/709,570, Non-Final Office Action, mailed Jan. 31, 2012.
U.S. Appl. No. 11/709,570, Non-Final Office Action, mailed Apr. 13, 2010.
U.S. Appl. No. 11/709,570, Final Office Action, mailed Jul. 2, 2012.
U.S. Appl. No. 11/709,570, Non-Final Office Action, mailed Oct. 28, 2010.
Silicon Defense, "Worm Containment in the Internal Network", Mar. 2003, pp. 1-25.
Nojiri, D. et al., "Cooperative Response Strategies for Large Scale Attack Mitigation", DARPA Information Survivability Conference and Exposition, Apr. 22-24, 2003, vol. 1, pp. 293-302.
Moore, D. et al., "Internet Quarantine: Requirements for Containing Self-Propagating Code", INFOCOM, Mar. 30-Apr. 3, 2003, vol. 3, pp. 1901-1910.
Williamson, Matthew M., "Throttling Viruses: Restricting Propagation to Defeat Malicious Mobile Code", ACSAC Conference, Dec. 2002, Las Vegas, NV, USA, pp. 1-9.

* cited by examiner

MALWARE CONTAINMENT AND SECURITY ANALYSIS ON CONNECTION

CROSS-REFERENCE TO RELATED APPLICATIONS

This application is a continuation-in-part of U.S. patent application Ser. No. 11/494,990, filed Jul. 28, 2006, now U.S. Pat. No. 8,375,444 entitled "Dynamic Signature Creation and Enforcement", which is a continuation-in-part of U.S. patent application Ser. No. 11/471,072, filed Jun. 19, 2006, entitled "Virtual Machine with Dynamic Data Flow Analysis", which is a continuation-in-part of U.S. patent application Ser. No. 11/409,355, filed Apr. 20, 2006, now U.S. Pat. No. 8,171,553 entitled "Heuristic Based Capture with Replay to Virtual Machine", which is a continuation-in-part of U.S. patent application Ser. No. 11/096,287, filed Mar. 31, 2005, entitled "System and Method of Detecting Computer Worms," and is a continuation-in-part of U.S. patent application Ser. No. 11/151,812, filed Jun. 13, 2005, entitled "System and Method of Containing Computer Worms," and is a continuation-in-part of U.S. patent application Ser. No. 11/152,286, filed Jun. 13, 2005, entitled "Computer Worm Defense System and Method" U.S. patent application Ser. No. 11/096,287 claims the benefit to of U.S. Provisional Application No. 60/559,198, filed Apr. 1, 2004, entitled "System and Method of Detecting Computer Worms." U.S. patent application Ser. No. 11/151,812 claims the benefit of U.S. Provisional Application No. 60/579,953, filed Jun. 14, 2004, entitled "System and Method of Containing Computer Worms." U.S. patent application Ser. No. 11/152,286 claims the benefit of U.S. Provisional Application No. 60/579,910, filed Jun. 14, 2004, entitled "Computer Worm Defense System and Method." All the above-referenced applications are incorporated by reference herein.

This application is also related to U.S. patent application Ser. No. 11/717,475, filed Mar. 12, 2007, entitled "Malware Containment on Connection", U.S. patent application Ser. No. 11/717,474, filed Mar. 12, 2007, entitled "Systems and Methods for Malware Attack Prevention", and U.S. patent application Ser. No. 11/717,476, filed Mar. 12, 2007, entitled "Systems and Methods for Malware Attack Detection and Identification". The above-referenced related nonprovisional patent applications are also incorporated by reference herein.

BACKGROUND OF THE INVENTION

1. Field of the Invention

The present invention relates generally to containment of malware. More particularly, the present invention relates to the containment of malware attacks from digital devices upon connection to a communication network.

2. Background Art

As the workplace becomes more automated, the use of computers and networks is commonplace. Computers have become indispensable tools that afford access to files and resources. Unfortunately, computers and networks can also place those files and resources at risk.

Computers can become infected with worms and viruses that replicate themselves and seek to damage files or limit network resources. As such, it is not uncommon to read in newspapers of a single infected computer that limited or destroyed the functionality of one or more networks. The cost caused by the damage from these attacks is enormous.

Currently, information technology (IT) staff and administrators have sought to limit worms and viruses by cleaning individual computers of worms/viruses, requiring anti-virus applications, and installing firewall applications on network servers and routers. Once the network is clear of worms and viruses, the IT staff and administrators continue to upgrade antivirus/firewall applications as well as virus/worm definitions for each server and router.

Even if the network is clean of viruses and worms, computers may still become infected. In one example, users of computers connected to an otherwise "clean" network may bring their computer home from work where the computer becomes infected over the Internet or a home network. Even if the computer has an anti-virus application resident on the machine, the anti-virus application may be insufficient to block or correct all possible attacking worms or viruses. Further, the anti-virus application or the worm/virus signature files may be out of date. Moreover, some worms or viruses may not be identified by some anti-virus applications or the worms or viruses may not be previously identified (e.g., a "zero day" attack) and, as such, a worm/virus signature that identifies the worm or virus may not exist. When the computer is brought back to work and reconnected to the network, the worm or virus may activate, make copies of itself, identify other machines on the network, gather information about the network, compromise network security, and/or infect other machines.

IT staff will occasionally apply agents to individual computers to search for updates or patches to the operating system or anti-virus to reduce the possibility of malware attack. Unfortunately, the agents must be installed onto each computer. Further, the different agents must be configured and installed on different machines with different operating systems. Even if the proper agent is installed on a machine, the agent may only seek to update the operating system or anti-virus application after predetermined periods of time. If a computer becomes infected due to outdated anti-virus applications, outdated virus definitions, or an operating system vulnerability, the corrective patch or update may not be retrieved by the agent until damage is already caused.

SUMMARY OF THE INVENTION

Systems and methods for malware containment and security analysis on connection are provided. In exemplary embodiments, network data from digital devices are quarantined for a predetermined period of time upon connection to the communication network. When a digital device is quarantined, all network data transmitted by the digital device is directed to a controller which then analyzes the network data to identify unauthorized activity and/or malware within the newly connected digital device. An exemplary method to contain malware comprises detecting a digital device upon connection with a communication network, quarantining network data from the digital device for a predetermined period of time, transmitting a command to the digital device to activate a security program to identify security risks, and analyzing the network data to identify malware within the digital device.

In some embodiments, the method further comprises receiving a security profile of the digital device form the security program. A command may be transmitted to the digital device to update security files or reconfigure security settings on the digital device.

Quarantining network data can comprise ARP manipulation, the configuration of DHCP services, or the reconfiguration of a switch to direct network data from the digital device to the controller. Analyzing the network data may comprise configuring a virtual machine to receive the network data and analyzing the response of the virtual machine to the network data to identify a malware attack. In various embodiments, the method further comprises generating an unauthorized activity signature based on the identification of the malware attack.

Analyzing the network data may comprise analyzing the network data with a heuristic to identify network data containing suspicious activity, configuring a virtual machine to receive the network data, and analyzing the response of the virtual machine to the network data to identify the malware within the digital device. Further, analyzing the network data may comprise retrieving a virtual machine configured to receive the network data, configuring a replayer to transmit the network data to the virtual machine, and analyzing a response by the virtual machine to the network data to identify the malware within the digital device.

A malware containment system can comprise a controller for containing malware. The controller may comprise a quarantine module, a security module, and an analysis environment. The quarantine module is configured to detect a digital device upon connection with a communication network and quarantine network data from the digital device for a predetermined period of time. The security module is configured to transmit a command to the digital device to activate a security program to identify security risks. The analysis environment configured to analyze the network data to identify malware within the digital device.

In various embodiments, a machine readable medium may have executable code embodied thereon, the executable code being executable by a processor for performing a malware containment method. The malware containment method can comprise detecting a digital device upon connection with a communication network, quarantining network data from the digital device for a predetermined period of time, transmitting a command to the digital device to activate a security program to identify security risks, and analyzing the network data to identify malware within the digital device.

DESCRIPTION OF EXEMPLARY EMBODIMENTS

Figure 1:
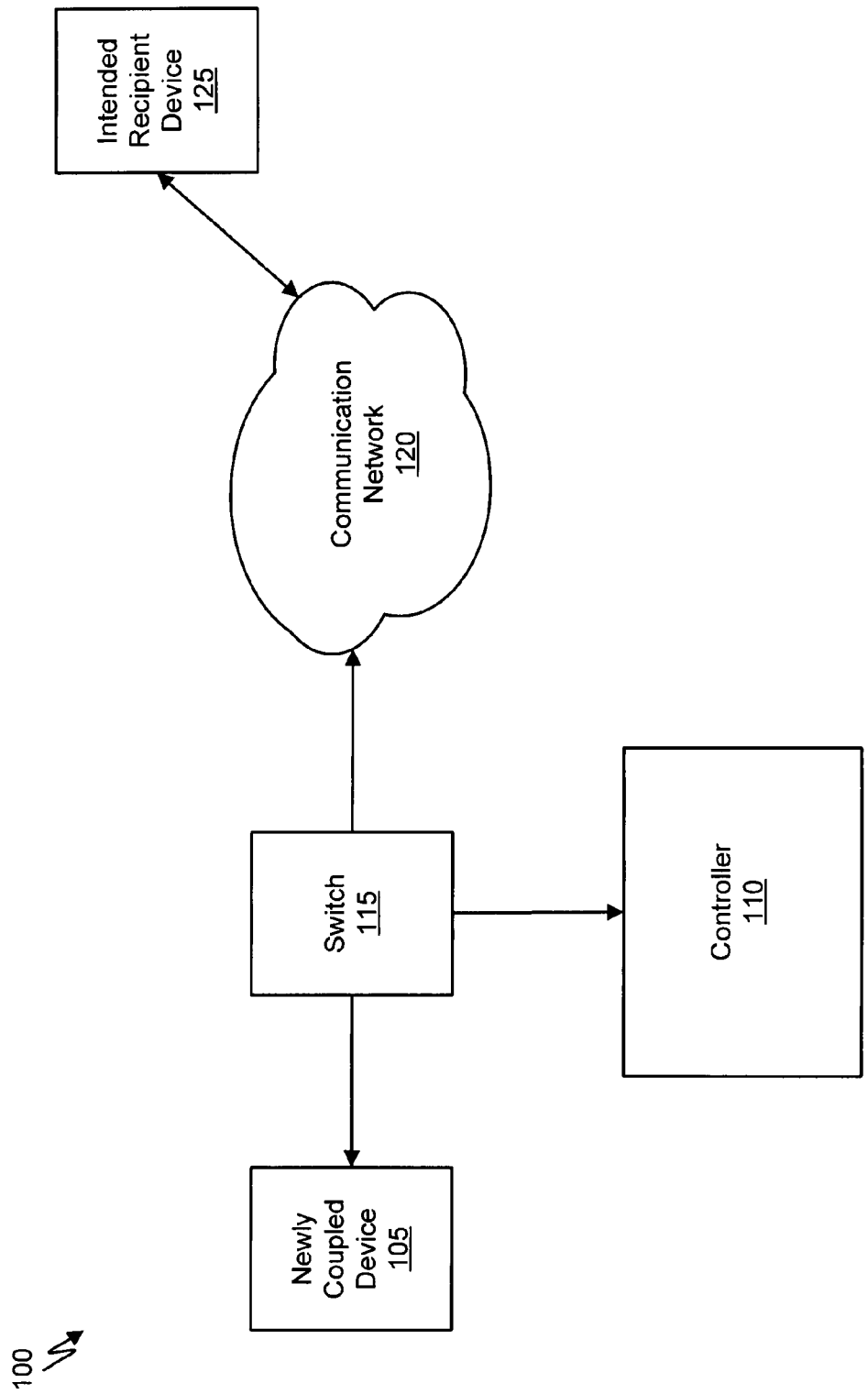
FIG. 1 is a diagram of a malware containment environment in which embodiments of the present invention may be practiced.

Exemplary systems and methods for malware containment and security analysis are provided. In exemplary embodiments, digital devices are quarantined for a predetermined period of time upon connection. When a digital device is quarantined, all network data transmitted by the digital device is directed to a controller which then analyzes the network data to identify unauthorized activity and/or malware within the newly connected digital device. Security programs resident on the quarantined digital device may be activated to generate a profile of the security status of the digital device, update security files, and/or reconfigure security settings.

If malware is identified as present within the digital machine, corrective action can be taken. Possible corrective actions include, but are not limited to, permanently quarantining the infected digital device, transmitting a patch to remove the malware, generating an unauthorized activity signature, and sending the unauthorized activity signature to the client to remove the malware.

If malware is not identified as present within the digital machine, the network data directed to the controller can be re-transmitted to the proper destination. The quarantine continues until the predetermined period of time expires and no evidence of malware is found.

Malware is software created and distributed for malicious purposes and can take the form of viruses, worms, trojan horses or adware, for example. A virus is an intrusive program that infects a computer file by inserting a copy of itself in the file. The copy is usually executed when the file is loaded into memory, allowing the virus to infect other files. A worm is a program that propagates itself across multiple computers, usually by creating copies of itself in each computer's memory. A worm might duplicate itself in a computer so many times that it causes the computer to crash. A trojan horse is a destructive program disguised as a game, utility, or application. When run by a user or computer program, a trojan horse can harm the computer system while appearing to do something useful.

Malware may also include adware and spyware. Adware is a program configured to direct advertisements to a computer or a particular user. In one example, adware identifies the computer and/or the user to various websites visited by a browser on the computer. The website may then use the adware to either generate pop-up advertisements or otherwise direct specific advertisements to the user's browser. Spyware is a program configured to collect information regarding the user, the computer, and/or a user's network habits. In an example, spyware may collect information regarding the names and types of websites that the user browses and then transmit the information to another computer. Adware and spyware are often added to the user's computer after the user browses to a website that hosts the adware and/or spyware. The user is often unaware that these programs have been added and is similarly unaware of the adware and/or spyware's function.

Security programs on the quarantined digital device may also be activated by remote commands. Security programs are executable code which may be a part of the operating system of the digital device. There may be many security programs in each digital device. Further, there may be separate security programs for each different operating system (e.g., Microsoft Windows, Linux, Apple OS X.) In one example, a security program is an application program interface (API) resident on the digital device.

FIG. 1 is a diagram of a malware containment environment 100 in which embodiments of the present invention may be practiced. The malware containment environment 100 comprises a newly coupled device 105 and a controller 110 coupled to a switch 115. The switch 115 is further coupled to a communication network 120. An intended recipient device 125 is also coupled to the communication network 120. In some embodiments, the controller 110 is coupled to the switch 115 over a tap (not depicted.)

A newly coupled device 105 is any digital device that recently coupled to the switch 115 and/or the communication network 120. The intended recipient device 125 is any digital device to which the newly coupled device 105 transmits network data. A digital device is any device comprising one or more processors. Some examples of digital devices include computers, servers, laptops, personal digital assistants, and cellular telephones. Network data comprises signals and data transmitted from the newly coupled device 105. Although FIG. 1 depicts the intended recipient device 125 as coupled to the communication network 120, the intended recipient device 125 may be directly coupled to the newly coupled device 105 or the switch 115. There may be any number of newly coupled devices 105, controllers 110, switches 115, communication networks 120, and/or intended recipient devices 125.

The controller 110 is any digital device or software configured to receive and analyze network data for the presence of malware. In exemplary embodiments, the controller 110 detects the presence of a newly coupled device 105 when the newly coupled device 105 initially couples to the switch 115 or to the communication network 120. The controller 110 intercepts network data transmitted from the newly coupled device 105 for a predetermined period of time. In other embodiments, the switch 115 is configured to direct network data transmitted from the newly coupled device 105 to the controller 110 for a predetermined period of time. The switch 115 is further discussed herein.

The controller 110 may also be configured to transmit a command to the newly coupled device 105 to activate one or more security programs. The one or more security programs can be resident within the newly coupled device 105 and are configured to operate security functions. Advantageously, the controller 110 can scan and activate security programs on the newly coupled device 105 without the necessity of installing agents on each digital device. As such, multiple security programs on multiple machines may be activated upon connection to a switch 115 or communication network 120. By performing security functions upon connection, the newly coupled device 105 is protected from ongoing malware and other devices already coupled to the switch 115 or to the communication network 120 (e.g., the intended recipient device 125) are protected from newly coupled devices 105 that may have been infected with malware from other sources. Security functions are further described in FIG. 2.

The network data is then analyzed by the controller 110 to determine evidence of a malware attack. If malware or an attack is detected, the controller 110 may perform corrective actions. If no malware is detected, the network data may be re-transmitted to the intended recipient device 125 (e.g., another digital device on the communication network 120). The controller 110 is further discussed in FIG. 2.

The switch 115 is any device configured to receive and direct network data between one or more digital devices. Examples of a switch 115 include, but are not limited to, a router, gateway, bridge, and/or server.

The communication network 120 couples two or more digital devices together to allow the digital devices to communicate and transmit network data to each other. In some examples, the communication network 120 can be a public computer network such as the Internet, or a private computer network such as a wireless telecommunication network, wide area network, or local area network. In some embodiments, the communication network 120 comprises multiple routers, bridges, and hubs that couple a large number of digital devices.

In various embodiments, the controller 110 can receive network data from the communication network 120 over a tap (not depicted). The tap is a digital data tap configured to receive network data and provide a copy of the network data to the controller 110. In one example, the tap intercepts and copies network data without an appreciable decline in performance of devices coupled to the communication network 120, the newly coupled device 105, and/or the switch 115. The tap can copy any portion of the network data. For example, the tap can receive and copy any number of data packets from the network data. In other embodiments, the controller 110 receives network data from the communication network 120 over a span port.

In some embodiments, the network data can be organized into one or more data flows and provided to the controller 110. In various embodiments, the tap can sample the network data based on a sampling scheme. Data flows can be reconstructed based on the network data samples.

Figure 2:
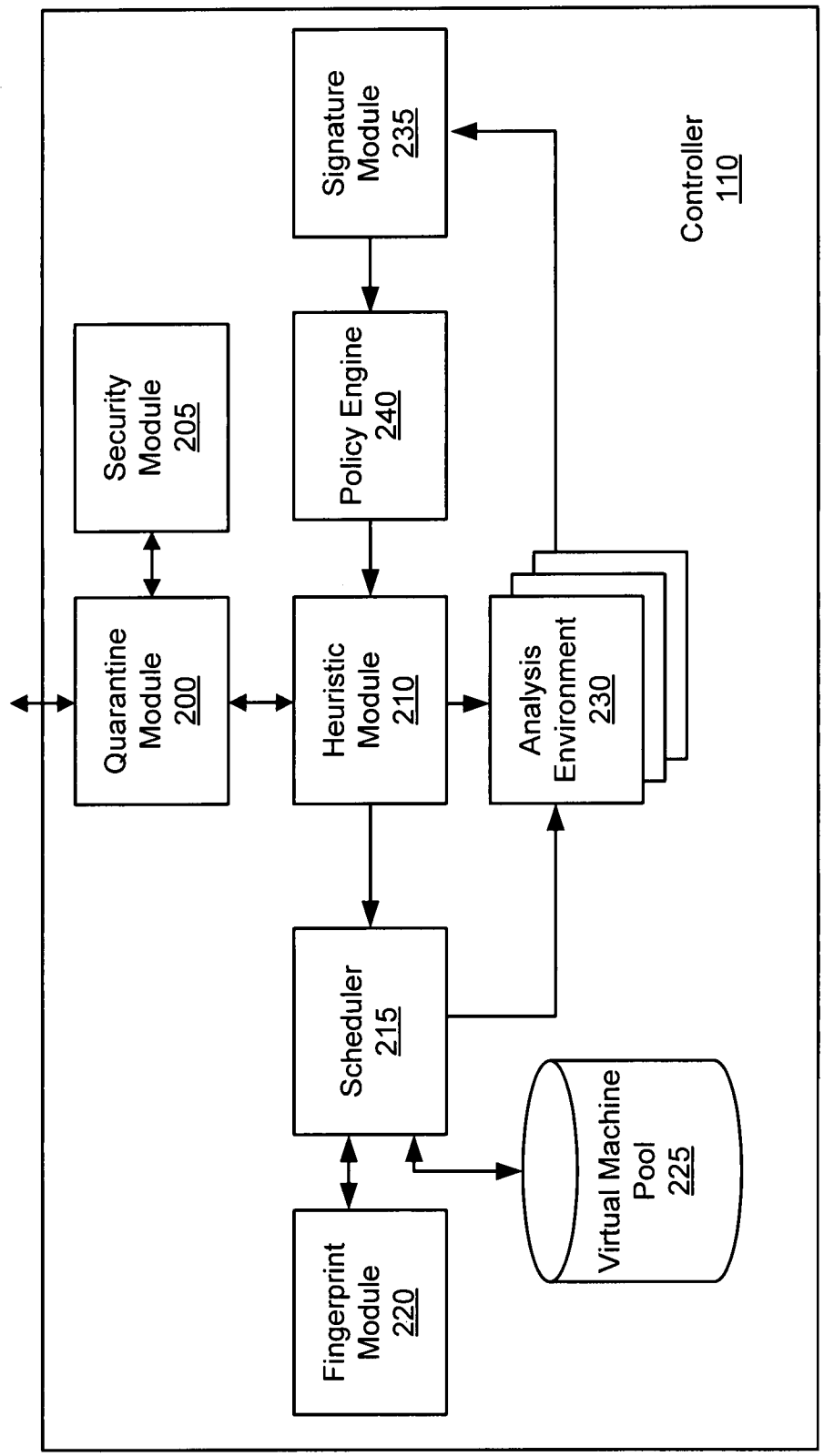
FIG. 2 is a block diagram of an exemplary controller implementing embodiments of the present invention.

FIG. 2 is a block diagram of an exemplary controller 110 implementing embodiments of the present invention. The controller 110 can be any digital device or software that receives network data. The controller 110 can comprise a quarantine module 200, a security module 205, a heuristic module 210, a scheduler 215, a fingerprint module 220, a virtual machine pool 225, an analysis environment 230, a signature module 235 and a policy engine 240. In some embodiments, the controller 110 comprises a tap or span port which is further coupled to the communication network 120. In other embodiments, the controller 110 is coupled to an external tap external span port, or may be directly coupled to the switch 115 or the communication network 120.

The quarantine module 200 detects one or more newly coupled devices 105 as they operatively couple to the network. When a newly coupled device 105 is detected, network data transmitted from the newly coupled device 105 is redirected to the controller 110 for a predetermined time. Network data redirected to the controller 110 is analyzed to determine if the network data contains suspicious data (discussed below) or a malware attack. If the predetermined time expires and no suspicious data or malware is identified, then the quarantine module 200 ceases to redirect network data from the newly coupled device 105. However, if suspicious data or the presence of malware is determined, then corrective action may be taken.

The quarantine module 200 can detect a newly coupled device 105 by detecting a request for network services. When a newly coupled device 105 couples to a network, the newly coupled device 105 is configured in communication with the communication network 120. In one example, a newly coupled device 105 may request an (internet protocol) IP address. The IP address request as well as the IP address assignment may be detected by the quarantine module 200. Thereafter, all network data from the IP address of the newly coupled device 105 may be quarantined for a predetermined period of time. Those skilled in the art will appreciate that there may be many ways to detect a newly coupled device 105 upon connection with the switch 115 and/or the communication network 120.

The quarantine module 200 can redirect network data from the newly coupled device 105 in any number of ways including, but not limited to, Address Resolution Protocol (ARP) manipulation, DHCP services, DHCP manipulation, or configuring the switch 115. In ARP manipulation (also known as ARP spoofing), a newly connected newly coupled device 105 may send an ARP request to the IP address of another digital device (e.g., intended recipient device 125) for the digital device's media address control (MAC) address. The quarantine module 200 may receive the ARP request, store the ARP request, and provide the controller 110 MAC address in an ARP reply to the switch 115 and/or the newly coupled device 105. Once the switch 115 and/or the newly coupled device 105 receives the controller 110 MAC address in the ARP reply, the IP address of the digital device (e.g., intended recipient device 125) will be associated with the controller 110 MAC address (e.g., in memory storage or cache). Network data intended for the intended recipient device 125 may then be transmitted from the newly coupled device 105 to the controller 110.

In one example of ARP manipulation, a newly coupled device 105 may be infected with malware which becomes active upon coupling to a switch 115 and/or a communication network 120. The malware may send network data to any number of other digital devices. Before the attack can proceed, the newly coupled device 105 may send a separate ARP request for the IP address of every other digital device to which the malware wishes to send data. The controller 110 detects and responds to each ARP request by sending an ARP reply to each request with the controller 110 MAC address. The controller 110 MAC address may be associated with the IP addresses of the other digital devices on a table within the newly coupled device 105, switch 115, and/or server (not depicted). The table may be within memory, storage, buffered, and/or cached. All network data is then transmitted to the controller 110 for the predetermined time.

If malware or suspicious data within the network data is not detected by the controller 110, the network data may then be forwarded to the intended recipient device 125. In one example, the controller 110 scans and stores the IP address of each intended recipient device 125 of every ARP request. The controller 110 may then transmit an ARP request to receive each intended recipient device's MAC address. If the network data intended for an intended recipient device 125 does not contain suspicious data or a malware attack, the controller 110 may then send the network data to the intended recipient device 125. If the network data contains suspicious data or a malware attack, the network data may not be transmitted by the controller 110.

If, after a predetermined time, no suspicious activity or malware is detected within the network data, then the controller 110 may transmit new ARP responses to the newly coupled device 105, switch 115, and/or server. The new ARP responses can contain the correct MAC address for every ARP request originally sent by the newly coupled device 105. As a result, network data will no longer be directed to the controller 110.

The quarantine module 200 may manipulate dynamic host configuration protocol (DHCP) services to quarantine network data. As a newly coupled device 105 couples to the router 115 and/or the communication network 120 and requests an IP address from a DHCP server, the quarantine module 200 may respond to the DHCP services request to configure the newly coupled device 105 to transmit network data to the controller 110. In one example, the quarantine module 200 may configure the newly coupled device 105 with a gateway IP address that is the same as the controller's 110 IP address to send all network data to the controller 110. In other embodiments, the quarantine module 200 may perform DHCP services for the communication network 120 as a DHCP server. If, after the predetermined time no suspicious data or malware is detected, the digital device 105 can be reconfigured so that network data is no longer transmitted to the controller 110.

The quarantine module 200 may send a request to the switch 115 to redirect network data from any newly coupled device 105 to the controller 110 for the predetermined time. In some embodiments, executable code is loaded onto the switch 115. In one example, the executable code configures the switch 115 to direct network data from any newly coupled device 105 to the controller 110 for the predetermined time. In another example, the executable code allows the quarantine module 200 to transmit a request to the switch 115 to direct network data from the newly coupled device 105 to the controller 110. The predetermined time may be set by the quarantine module 200, preloaded into the switch 115, or configured by a user.

The quarantine module 200 may monitor network data directly or receive a copy of the network data over a tap. In one example, the quarantine module 200 monitors and scans network data to detect the presence of a newly coupled device 105. When a newly coupled device 105 is added to the communication network 120 and/or the switch 115, the quarantine module 200 quarantines network data from the newly coupled device 105 for the predetermined time. In another example, a tap may scan network data for newly connected digital devices 105 and alert the quarantine module 200 when such a newly coupled device 105 is discovered. The quarantine module 200 may redirect all network data from the newly coupled device 105 to the controller 110 over a separate link (not depicted) to the switch 115 or the communication network 120. In some embodiments, there is not a tap but rather, a span port.

The security module 205 is configured to transmit commands to one or more security program(s) on the newly configured device 105 and to analyze responses from the security program(s). The security program(s) are resident on the newly coupled device 105 and are configured to activate and control security functions.

Security functions comprise updating the operating system, updating security applications, or updating security application files. The operating system controls the components of the newly coupled device 105 and facilitates the operation of applications. Examples of operating systems include Windows XP, Linux, and MacOS. Security applications include those applications for which the primary function is security. Examples of security applications include anti-virus programs, firewalls, and anti-spyware applications. Security files are any files that support the security applications. Examples of security files include virus definitions or spyware updates.

The security program(s) may also generate a security profile of the newly coupled device 105. The security profile can comprise a list of updates or patches that the operating system needs or possesses. In one example, the security program comprises the Microsoft update API in the Microsoft Windows Operating system. The Microsoft update API can scan the newly coupled device 105 to compile a list of existing patches and updates. The list may then be compared to an update list at the Microsoft website to determine needed patches and updates.

The security profile may also include the security status of the security applications. The security status may indicate whether security applications are present on the newly coupled device 105, if the security applications are up to date, if the security files are up to date, if the security applications are active, if the security applications are configured correctly, and/or if the operating system is configured correctly.

In various embodiments, the security profile comprises a list of security applications on the newly coupled device 105. The security profile may also indicate which security applications are missing or inactive. The security profile may also indicate the date the security files were created and whether new security files may be available. In one example, the security profile shows the date when the anti-virus virus definitions file was created. The anti-virus virus definitions file is a file that comprises data to identify viruses and worms. The anti-virus definitions file may also include executable code configured to eliminate one or more viruses or worms. If the anti-virus virus definitions file is out of date, new viruses or worms may infect the newly coupled device 105 without detection by the anti-virus program.

The security status can also indicate whether the security applications are active. In one example, the security status indicates if the security applications are currently active. The security status may also indicate if the programs are automatically activated when the digital device is first turned on.

In some embodiments, the security status indicates the configuration of the security applications. In one example, the security status indicates if the firewall application is configured to block the transmission of network data from and/or to high risk programs. The security status may also indicate if the anti-virus application is configured to scan for viruses in e-mail as e-mail arrives. In some embodiments, the security status also indicates if other applications have appropriate security settings. In one example, the security status may show if an e-mail program will allow the delivery of executable programs attached to e-mail or whether a web browser allows active-x programs to run.

The security status may also indicate if the operating system on the newly coupled device 105 is configured correctly. In one example, the security status shows if the operating system is configured to allow remote access, allow remote control, share files or other resources, disable unnecessary controls, and to show the security provisions around functions that may allow external access to the digital device.

The heuristic module 210 can receive network data from the quarantine module 200. The heuristic module 210 applies heuristics and/or probability analysis to determine if the network data might contain suspicious activity. In one example, the heuristic module 210 applies a heuristic which identifies suspicious data within the network data. The heuristic module 210 then flags the network data as suspicious. The network data can then be buffered and organized into a data flow. The data flow can be provided to the scheduler 215. In some embodiments, the network data is provided directly to the scheduler 215 without buffering or organizing the data flow.

The heuristic module 210 can perform any heuristic and/or probability analysis. In one example, the heuristic module 210 performs a dark internet protocol (IP) heuristic. A dark IP heuristic can flag network data coming from the newly coupled device 105 that has not previously been identified by the heuristic module 210. The dark IP heuristic can also flag network data going to an unassigned IP address. In an example, an attacker (e.g., malware within a newly coupled device 105) scans random IP addresses of the communication network 120 to identify an active server or workstation. The dark IP heuristic can flag network data directed to an unassigned IP address.

The heuristic module 210 can also perform a dark port heuristic. A dark port heuristic can flag network data transmitted to an unassigned or unusual port address. Such network data transmitted to an unusual port can be indicative of a port scan by malware such as a worm or a hacker. Further, the heuristic module 210 can flag network data from the newly coupled device 105 that is significantly different than traditional data traffic generally transmitted by the newly coupled device 105. For example, the heuristic module 210 can flag network data from the newly coupled device 105 such as a laptop that begins to transmit network data that is common to a server.

The heuristic module 210 can retain data packets belonging to a particular data flow previously received (e.g., received from a tap) or data flow provided by the quarantine module 200. In one example, the heuristic module 210 receives data packets and stores the data packets within a buffer or other memory. Once the heuristic module 210 receives a predetermined number of data packets from a particular data flow, the heuristic module 210 performs the heuristics and/or probability analysis.

In some embodiments, the heuristic module 210 performs heuristic and/or probability analysis on a set of data packets belonging to a data flow and then stores the data packets within a buffer or other memory. The heuristic module 210 can then continue to receive new data packets belonging to the same data flow. Once a predetermined number of new data packets belonging to the same data flow are received, the heuristic and/or probability analysis can be performed upon the combination of buffered and new data packets to determine a likelihood of suspicious activity.

In some embodiments, an optional buffer receives the flagged network data from the heuristic module 210. The buffer can buffer and organize the flagged network data into one or more data flows before providing the one or more data flows to the scheduler 215. In various embodiments, the buffer can buffer network data and stall before providing the network data to the scheduler 215. In one example, the buffer stalls the network data to allow other components of the controller 110 time to complete functions or otherwise clear data congestion.

The scheduler 215 is a module configured to retrieve a virtual machine associated with the newly coupled device 105 or the intended recipient device 125 of the network data. A virtual machine is software that is configured to mimic the performance of a device (e.g., the intended recipient device 125 of the network data). The virtual machine can be retrieved from the virtual machine pool 225.

In some embodiments, the heuristic module 210 transmits the metadata identifying the intended recipient device 125 to the scheduler 215. In other embodiments, the scheduler 215 receives one or more data packets of the network data from the heuristic module 210 and analyzes the one or more data packets to identify the intended recipient device 125. In yet other embodiments, the metadata can be received from the tap.

The scheduler 215 can retrieve and configure the virtual machine to mimic the pertinent performance characteristics of the intended recipient device 125. In one example, the scheduler 215 configures the characteristics of the virtual machine to mimic only those features of the intended recipient device 125 that are affected by the network data copied by the tap. The scheduler 215 can determine the features of the intended recipient device 125 that are affected by the network data by receiving and analyzing the network data from the quarantine module 200. Such features of the intended recipient device 125 can include opening ports that are to receive the network data, select device drivers that are to respond to the network data, and configuring any other devices coupled to or contained within the intended recipient device 125 that can respond to the network data. In other embodiments, the heuristic module 210 can determine the features of the intended recipient device 125 that are affected by the network data by receiving and analyzing the network data from the tap. The heuristic module 210 can then transmit the features of the intended recipient device 125 to the scheduler 215.

The optional fingerprint module 220 is configured to determine the packet format of the network data to assist the scheduler 215 in the retrieval and/or configuration of the virtual machine. In one example, the fingerprint module 220 determines that the network data is based on a transmission control protocol/internet protocol (TCP/IP). Thereafter, the scheduler 215 will configure a virtual machine with the appropriate ports to receive TCP/IP packets. In another example; the fingerprint module 220 can configure a virtual machine with the appropriate ports to receive user datagram protocol/internet protocol (UDP/IP) packets. The fingerprint module 220 can determine any type of packet format of a network data.

In other embodiments, the optional fingerprint module 220 passively determines a software profile of the network data to assist the scheduler 215 in the retrieval and/or configuration of the virtual machine. The software profile may comprise the operating system (e.g., Linux RH6.2) of the newly coupled device 105 that generated the network data. The determination can be based on analysis of the protocol information of the network data. In an example, the optional fingerprint module 220 determines that the software profile of network data is Windows XP, SP1. The optional fingerprint module 220 can then configure a virtual machine with the appropriate ports and capabilities to receive the network data based on the software profile. In other examples, the optional fingerprint module 220 passes the software profile of the network data to the scheduler 215 which either selects or configures the virtual machine based on the profile.

The virtual machine pool 225 is configured to store virtual machines. The virtual machine pool 225 can be any storage capable of storing software. In one example, the virtual machine pool 225 stores a single virtual machine that can be configured by the scheduler 215 to mimic the performance of any intended recipient device 125 on the communication network 120. The virtual machine pool 225 can store any number of distinct virtual machines that can be configured to simulate the performance of any intended recipient device 125.

The analysis environment 230 is a module that simulates transmission of the network data between the newly coupled device 105 and the intended recipient device 125 to analyze the effects of the network data upon the intended recipient device 125. The analysis environment 230 can identify the effects of malware or illegitimate computer users (e.g., a hacker, computer cracker, or other computer user) by analyzing the simulation of the effects of the network data upon the intended recipient device 125 that is carried out on the virtual machine. There can be multiple analysis environments 230 to simulate multiple network data.

As the analysis environment 230 simulates the transmission of the network data, behavior of the virtual machine can be closely monitored for unauthorized activity. If the virtual machine crashes, performs illegal operations, performs abnormally, or allows access of data to an unauthorized computer user, the analysis environment 230 can react. In some embodiments, the analysis environment 230 performs dynamic taint analysis to identify unauthorized activity (dynamic taint analysis is further described in FIG. 3.)

Once unauthorized activity is detected, the analysis environment 230 can generate the unauthorized activity signature configured to identify network data containing unauthorized activity. Since the unauthorized activity signature does not necessarily require probabilistic analysis to detect unauthorized activity within network data, unauthorized activity detection based on the unauthorized activity signature may be very fast and save computing time.

In various embodiments, the unauthorized activity signature may provide code that may be used to eliminate or "patch" portions of network data containing an attack. Further, in some embodiments, the unauthorized activity signature may be used to identify and eliminate (i.e., delete) the malware causing the attack. The unauthorized activity signature may also be used to configure digital devices to eliminate vulnerabilities (e.g., correct system settings such as disabling active-x controls in a browser or updating an operating system.)

The analysis environment 230 may store the unauthorized activity signature within the signature module 235. The analysis environment 230 may also transmit or command the transmission of the unauthorized activity signature to one or more other controllers 110, switches 115, digital devices 105, and/or servers. By automatically storing and transmitting the unauthorized activity signature, known malware, previously unidentified malware, and the activities of illicit computer users can be quickly controlled and reduced before a computer system is damaged or compromised. The analysis environment 230 is further discussed with respect to FIG. 3.

The signature module 235 receives, authenticates, and stores unauthorized activity signatures. The unauthorized activity signatures may be generated by the analysis environment 230 or another controller 110. The unauthorized activity signatures may then be transmitted to the signature module 235 of one or more controllers 110.

The policy engine 240 is coupled to the heuristic module 210 and is a module that may identify network data as suspicious based upon policies contained within the policy engine 240. In one example, a newly coupled device 105 can be a computer designed to attract hackers and/or worms (e.g., a "honey pot"). The policy engine 240 can contain a policy to flag any network data directed to the "honey pot" as suspicious since the "honey pot" should not be receiving any legitimate network data. In another example, the policy engine 240 can contain a policy to flag network data directed to any intended recipient device 125 that contains highly sensitive or "mission critical" information.

The policy engine 240 can also dynamically apply a rule to copy all network data related to network data already flagged by the heuristic module 210. In one example, the heuristic module 210 flags a single packet of network data as suspicious. The policy engine 240 then applies a rule to flag all data related to the single packet (e.g., data flows) as suspicious. In some embodiments, the policy engine 240 flags network data related to suspicious network data until the analysis environment 230 determines that the network data flagged as suspicious is related to unauthorized activity.

The policy engine 240 may scan network data to detect unauthorized activity based upon an unauthorized activity signature. In some embodiments, the policy engine 240 retrieves the unauthorized activity signature from the signature module 235. The network data is then scanned for unauthorized activity based on the unauthorized activity signature.

The policy engine 240 can scan the header of a packet of network data as well as the packet contents for unauthorized activity. In some embodiments, the policy engine 240 scans only the header of the packet for unauthorized activity based on the unauthorized activity signature. If unauthorized activity is found, then no further scanning may be performed. In other embodiments, the policy engine 240 scans the packet contents for unauthorized activity.

Advantageously, unauthorized activity may be found by scanning only the header of a packet, the contents of the packet, or both the header and the contents of the packet. As a result, unauthorized activity that might otherwise evade discovery can be detected. In one example, evidence of unauthorized activity may be located within the contents of the packet. By scanning only the contents of the packet, unauthorized activity may be detected.

If the packet contents or the packet header indicate that the network data contains unauthorized activity, then the policy engine 240, the heuristic module 210, or the signature module 235 may take action. In one example, the policy engine 240 may generate a rule or command the quarantine module 200 to permanently quarantine the newly coupled device 105 and delete or bar the packet from the communication network 120. The policy engine 240 and/or the quarantine module 200 may also quarantine, delete, or bar other packets belonging to the same data flow as the unauthorized activity packet.

Figure 3:
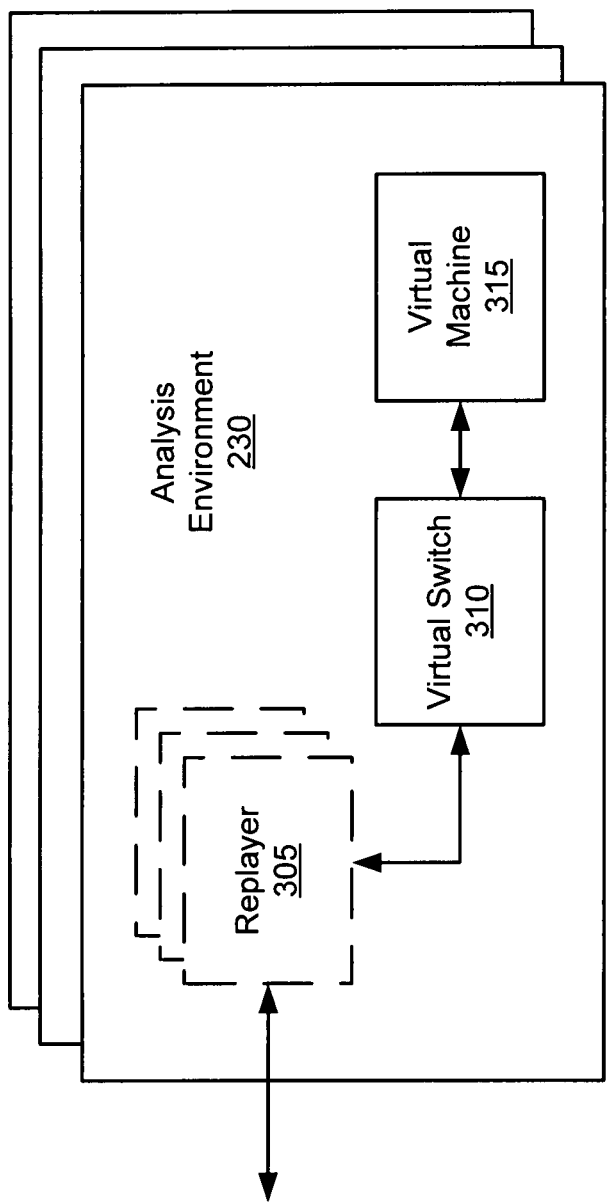
FIG. 3 is a block diagram of an exemplary analysis environment.

FIG. 3 depicts an analysis environment 230, in accordance with one embodiment of the present invention. The analysis environment 230 comprises an optional replayer 305, a virtual switch 310, and a virtual machine 315. The replayer 305 receives network data that has been flagged by the heuristic module 210 and replays the network data in the analysis environment 230. In some embodiments, the replayer 305 mimics the behavior of the newly coupled device 105 in transmitting the flagged network data. There can be any number of replayers 305 simulating the transmission of network data between the digital device and the intended recipient device 125. In a further embodiment, the replayer 305 dynamically modifies session variables, as is appropriate, to emulate a "live" client or server of the protocol sequence being replayed. In one example, dynamic variables that may be dynamically substituted include dynamically assigned ports, transaction IDs, and any other variable that is dynamic to each protocol session. In other embodiments, the network data received from the heuristic module 210 is transmitted to the virtual machine 315 without a replayer 305.

The virtual switch 310 is software that is capable of forwarding packets of flagged network data to the virtual machine 315. In one example, the replayer 305 simulates the transmission of the data flow by the newly coupled device 105. The virtual switch 310 simulates the communication network 120 and the virtual machine 315 simulates the intended recipient device 125. The virtual switch 310 can route the data packets of the data flow to the correct ports of the virtual machine 315.

The virtual machine 315 is a representation of the intended recipient device 125 that can be provided to the analysis environment 230 by the scheduler 215. In one example, the scheduler 215 retrieves a virtual machine 315 from the virtual machine pool 225 and configures the virtual machine 315 to mimic the intended recipient device 125. The configured virtual machine 315 is then provided to the analysis environment 230 where it can receive flagged network data from the virtual switch 310.

As the analysis environment 230 simulates the transmission of the network data, behavior of the virtual machine 315 can be closely monitored for unauthorized activity. If the virtual machine 315 crashes, performs illegal operations, performs abnormally, or allows access of data to an unauthorized computer user, the analysis environment 230 can react.

In some embodiments, the analysis environment 230 performs dynamic taint analysis to identify unauthorized activity. For a malware attack to change the execution of an otherwise legitimate program, the malware attack may cause a value that is normally derived from a trusted source to be derived from the user's own input. Program values (e.g., jump addresses and format strings) are traditionally supplied by a trusted program and not from external untrusted inputs. Malware, however, may attempt to exploit the program by overwriting these values.

In one example of dynamic taint analysis, all input data from untrusted or otherwise unknown sources are flagged. Program execution of programs with flagged input data is then monitored to track how the flagged data propagates (i.e., what other data becomes tainted) and to check when the flagged data is used in dangerous ways. For example, use of tainted data as jump addresses or format strings often indicates an exploit of a vulnerability such as a buffer overrun or format string vulnerability.

In some embodiments, the analysis environment 230 monitors and analyzes the behavior of the virtual machine 315 in order to determine a specific type of malware or the presence of an illicit computer user. The analysis environment 230 can also generate computer code configured to eliminate new viruses, worms, or other malware. In various embodiments, the analysis environment 230 can generate computer code configured to identify data within the network data indicative of a malware attack, repair damage performed by malware, or the illicit computer user. By simulating the transmission of suspicious network data and analyzing the response of the virtual machine, the analysis environment 230 can identify known and previously unidentified malware and the activities of illicit computer users before a computer system is damaged or compromised.

Figure 4:
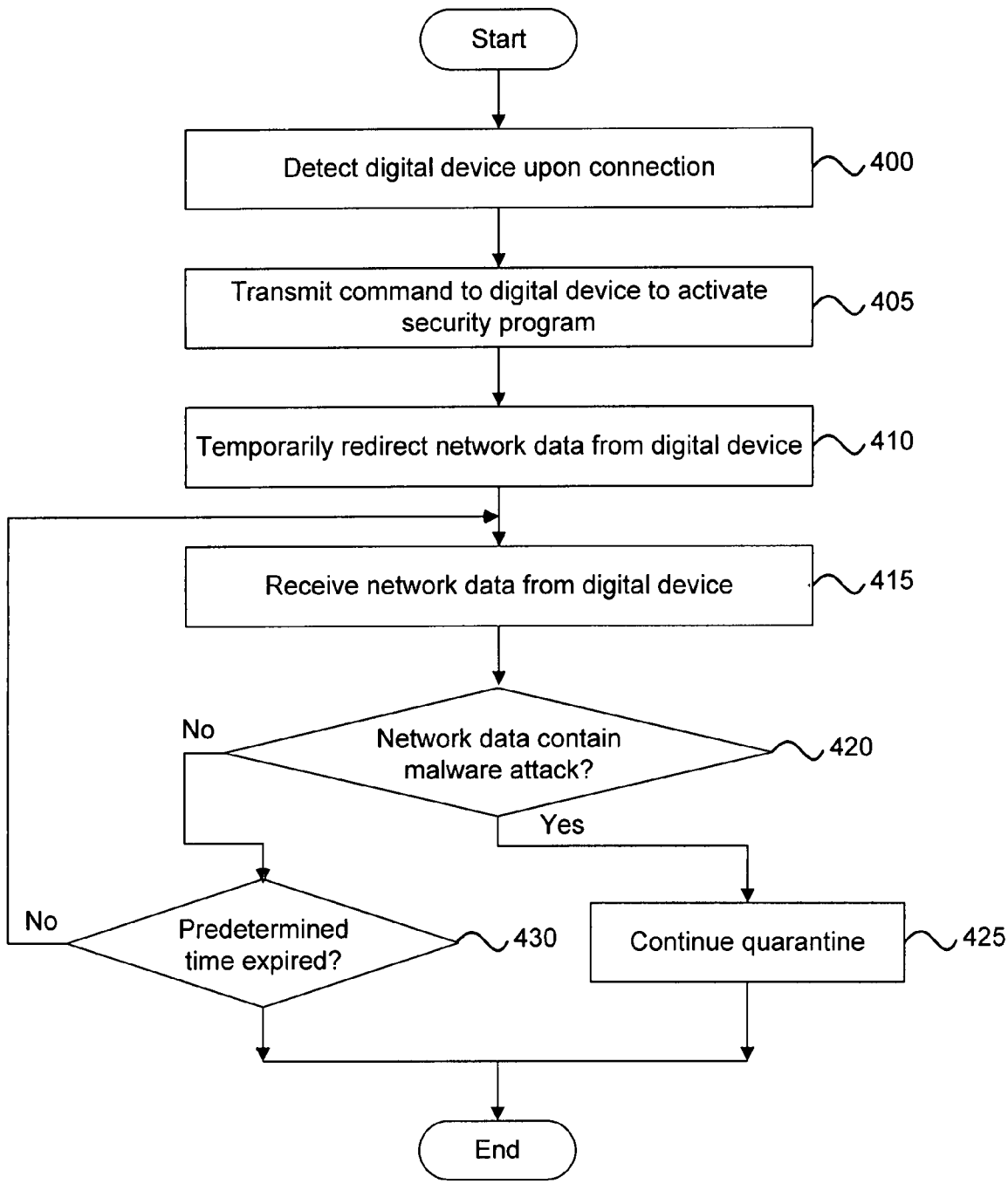
FIG. 4 is a flowchart of an exemplary method for malware containment upon connection of a digital device.

FIG. 4 is a flowchart of an exemplary method for malware containment and security analysis upon connection of a newly coupled device 105. In step 400, the controller 110 detects a newly coupled device 105 upon connection with the switch 115 and/or the communication network 120. In one example, a user brings a laptop or other computer from home and then couples the laptop or other computer to the communication network 120. The newly coupled device 105 (i.e., laptop or other computer) requests network resources which is detected by the controller 110.

In various embodiments, the controller 110 receives copies of network data from the switch 115 or the communication network 120 over a tap. The tap can transparently copy network data from the switch 115 and/or the communication network 120. The copy of network data is analyzed to determine if a newly coupled device 105 is requesting network services. In other embodiments, the controller 110 monitors network data directly to identify requests for network services.

In step 405, the security module 205 transmits a command to the newly coupled device 105 to activate one or more security programs. In various embodiments, the security module 205 transmits a command to an API resident on the newly coupled device 105 to update security applications, update security application files, and patch vulnerabilities within the operating system of the newly coupled device 105. In one example, a newly coupled device 105 with a Microsoft Windows operating system may receive the command to activate an API. The API downloads and installs operating systems patches (e.g., "critical" or "serious" updates from the Microsoft Windows update website.)

The security module 205 may also transmit commands to activate a third-party security program on the newly coupled device 105. In one example, the security module 205 may command the update program for Norton Anti-Virus to update the program and anti-virus files for the Norton Anti-Virus program. The security module 205 may transmit any number of commands to update security programs and/or security files.

In step 410, the quarantine module 200 quarantines network data from the newly coupled device 105. In one example, the controller 110 identifies a newly coupled device 105. The quarantine module 200 redirects network data transmitted from the newly coupled device 105 for a predetermined time.

In step 415, the controller 110 receives the network data from the newly coupled device 105. In various embodiments, the network data is received over a separate link without a tap between the controller 110 and the switch 115 or communication network 120. In one example, the controller 110 comprises an IP address. Network data directed to the controller 110 IP address (e.g., network data transmitted by the newly coupled device 105 to a gateway IP address that is the same as the controller 110 IP address) may be received by the controller 110 over the link.

In step 420, the controller 110 determines if a malware attack is within the network data. The heuristic module 210 can determine if the network data contains suspicious activity. In some embodiments, if the network data contains suspicious activity, then the heuristic module 210 directs the quarantine module 200 to take corrective action in step 425. In other embodiments, if the network data contains suspicious activity, the network data flagged as suspicious is directed to the analysis environment 230 for analysis to identify unauthorized activity. If unauthorized activity is identified, then the analysis environment 230 directs the quarantine module 200 to take corrective action in step 425.

In step 425, the quarantine module 200 takes corrective action. Corrective actions can include, but are not limited to, the permanent quarantine of network data from the newly coupled device 105. In various embodiments, the controller 110 continues to analyze network data from the newly coupled device 105 to further identify the malware or identify different types of malware on the newly coupled device 105. Notifications of malware may be sent to the newly coupled device 105, server, or security stations on the communication network 120. The signature module 235 may generate unauthorized activity signatures based on the identified malware attack.

If the heuristic module 210 does not flag the network data as suspicious and/or malware is not found by the analysis environment 230, then the quarantine module 200 determines if the predetermined time is expired in step 430. If the predetermined time is not expired, the controller 110 continues to receive network data from the digital device in step 415. If the predetermined time is expired, then the method ends. In various embodiments, if the heuristic module 210 does not flag the network data as suspicious and/or malware is not found by the analysis environment 230, the controller 110 (e.g., quarantine module 200) forwards the network data to the intended recipient device 125.

Figure 5:
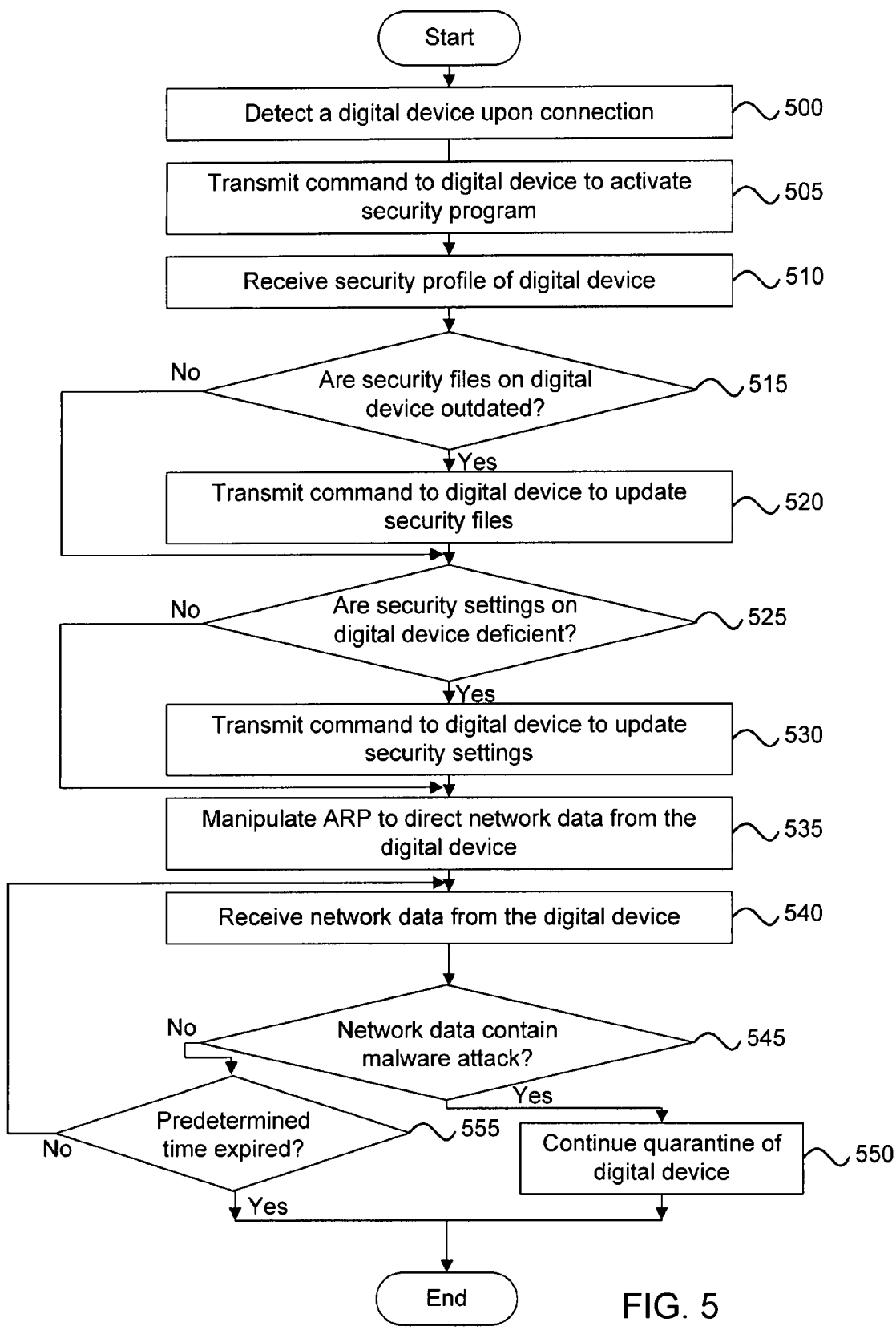
FIG. 5 is another flowchart of an exemplary method for malware containment upon connection of a digital device.

FIG. 5 is another flowchart of an exemplary method for malware containment upon connection of a newly coupled device 105. In step 500, the controller 110 detects the newly coupled device 105 upon connection with the switch 115 and/or the communication network 120.

In step 505, the security module 205 transmits a command to the newly coupled device 105 to activate a security program. The security program may generate a security profile and transmit the profile back to the security module 205. In some embodiments, the security profile comprises a list of security applications present on the newly coupled device 105, a list of security files with associated creation dates as well as a list of the security settings on the newly coupled device 105.

The list of security files and creation dates can comprise a list of operating system security files. In one example, the list of operating system security files comprises a list of updates and patches present within the operating system of the newly coupled device 105. The list of security files and creation dates can also comprise a list of third-party security files. The list of third-party security files may comprise a list of updates, upgrades, virus definitions, application definitions, and spyware definitions that support anti-virus, firewall, and anti-virus applications produced by a party (i.e., business or individual) separate from the producer of the operating system.

In various embodiments, the security module 205 can scan the list and contact websites to determine the most up-to-date operating system updates and patches as well as the most up-to-date third-party security files. The security module 205 may then determine if the patches, updates, and security files are current. In other embodiments, the security profile comprises a list of operating system security files and third-party security files that need to be updated on the newly coupled device 105. In yet other embodiments, the security profile comprises a list of operating system security files and third-party security files updates, patches, and upgrades that may be installed on the newly coupled device 105.

In step 515, the security module 205 determines if any of the operating system security files and/or the third-party security files are outdated. If any of the security files are outdated, the security module 205 can transmit a command to the newly coupled device 105 to activate a program that updates the security files in step 520. In one example, the security module 205 transmits multiple commands to different APIs present on the newly coupled device 105 to find, download, and install patches, updates, and upgrades to the security applications. The security module 205 may comprise a security application table that tracks which API to call depending on the security applications resident on the newly coupled device 105 identified in the security profile.

If the security files on the newly coupled device 105 are updated, then the security module determines if the security settings identified within the security profile are deficient in step 525. In exemplary embodiments, the security module 205 comprises a settings table that indicates one or more levels of security and settings associated with each level.

Security settings comprise various configurations for operating systems and applications that may make the newly coupled device 105, data within the newly coupled device 105, and control of the newly coupled device 105 more secure. In one example, security settings for an operating system may comprise settings to disable remote control of the operating system, disable sharing of files or resources, enable passwords on active screensavers, enable administrator privileges, and limit user privileges. Other security settings may comprise configuring when and how often an anti-virus application scans for viruses, when and how often an anti-spyware application scans for spyware, limiting external access to the newly coupled device 105 through the firewall application, as well as limitations or disabling active-x or javascript in webbrowsers. Those skilled in the art will appreciate that there may be many settings of operating systems and applications that may be identified by the security module 205.

The level may be set by the user of the newly coupled device 105, a network administrator, and/or the user of the controller 110. In various embodiments, the level may comprise a setting of the security level which may include high, very high, medium, low, or none. Each level may be associated with a different list of security settings within the security module 205. In one example, a network administrator configures the security module 205 to "high". Thereafter, the security module 205 may scan a received security profile for security settings and compare them with the security settings for the "high" level. If the security settings within the security profile do not meet or exceed the security settings within the security module 205 (e.g., those associated with the "high" level,) then the security module 205 may transmit commands to one or more security programs on the newly coupled device 105 to correct the security settings in step 530.

In various embodiments, different security programs may be associated with different security settings within the security module 205. The security module 205 can identify deficient security settings and activate the associated security program.

If the security settings on the newly coupled device 105 are not deficient, the quarantine module 200 manipulates the ARP to direct network data transmitted from the newly coupled device 105 to the controller 110 in step 535.

In step 540, the controller 110 receives the network data from the newly coupled device 105 and determines if the network data contains a malware attack. In various embodiments, the network data is analyzed to determine whether the network data is suspicious. For example a heuristic module, such as the heuristic module 210, can analyze the network data. The heuristic module 210 can base the determination on heuristic and/or probabilistic analyses. In various embodiments, the heuristic module has a very low threshold to determine whether the network data is suspicious. For example, a single command within the network data directed to an unusual port of the destination device can cause the network data to be flagged as suspicious.

The heuristic module 210 can alternatively include flagging network data as suspicious based on policies such as the identity of a newly coupled device 105, the intended recipient device 125, or the activity contained within the network data. In one example, even if the heuristic module 210 does not flag the network data, the network data can be flagged as suspicious based on a policy if the network data was transmitted from a device that does not normally transmit network data. Similarly, based on another policy, if the intended recipient device 125 or the newly coupled device 105 contains trade secrets or other critical data, then any network data so transmitted can be flagged as suspicious. Similarly, if the network data is directed to a particularly important database or is attempting to gain rights or privileges within the communication network 120, the switch 115 or the intended recipient device 125, then the network data can be flagged as suspicious. In various embodiments, the policy engine 240 flags network data based on these and/or other policies.

In some embodiments, if the network data is flagged as suspicious, the quarantine module 200 may continue the quarantine of the network data indefinitely in step 550. In other embodiments, if the network data is flagged as suspicious, the network data may be provided to the analysis environment 230 to analyze the response of a virtual machine to the network data to identify malware attacks or other unauthorized activity. If a malware attack or other unauthorized activity is identified, then the quarantine of the network data from the newly coupled device 105 may continue indefinitely in step 550. If the network data is not flagged as suspicious or there is no evidence of a malware attack or other unauthorized activity in the network data previously flagged as suspicious, then the quarantine module 200 determines if the predetermined time has expired in step 555. If the predetermined time has not expired, then the controller 110 continues to receive the network data in step 540. If the predetermined time has expired, the method ends.

Figure 6:
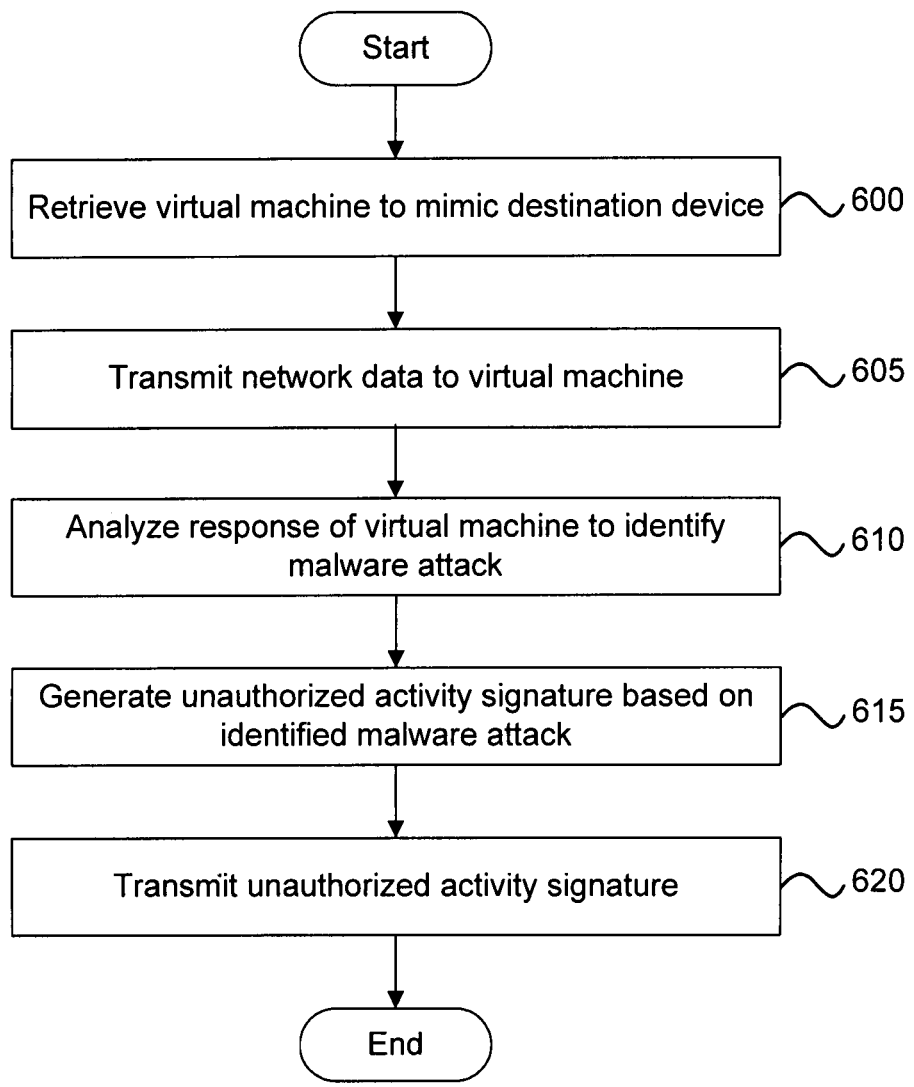
FIG. 6 is a flowchart of an exemplary method of generating and transmitting an unauthorized activity signature.

FIG. 6 is a flowchart of an exemplary method of analyzing network data, to generate an unauthorized activity signature. In step 600, the scheduler 215 scans the network data previously flagged as suspicious by the heuristic module 210 to determine the intended recipient device 125. In one example, the scheduler 215 scans the destination IP address contained within the network data to identify the intended recipient device 125. The scheduler 215 may then retrieve a virtual machine from the virtual machine pool 225. The virtual machine 315 may be previously configured to be similar to the intended recipient device 125. If there is no virtual machine 315 previously configured to be similar to the intended recipient device 125, then a generic virtual machine 315 may be retrieved by the scheduler 215. The scheduler 215 may configure to the virtual machine 315 retrieved from the virtual machine pool 225 to receive the network data (e.g., open ports, reduce or eliminate security settings, etc.) The scheduler 215 may then provide the virtual machine 315 to the analysis environment 230.

In step 610, the analysis environment 230 analyzes the response of the virtual machine 315 to the network data to identify a malware attack. In one example, an optional replayer 305 is configured to perform similarly to the newly coupled device 105 and transmit the network data over a virtual switch 310 to the virtual machine 315. In various embodiments, there may be any number of replayers 305 configured to transmit network data to different virtual machines 315 in parallel. Similarly, multiple analysis environments 230 may operate in parallel. The analysis environment 230 analyzes the response of the virtual machine 315 to the network data (e.g., with taint analysis).

If the network data does not contain unauthorized activity, then the method may end. If the network data contains unauthorized activity, then an unauthorized activity signature is generated based on the unauthorized activity in step 615. The unauthorized activity signature may be generated by the analysis environment 230 or the signature module 235.

In step 620, the unauthorized activity signature is transmitted to one or more other controllers 110 or any digital device (e.g., a server, a newly coupled device 105, or a switch 115). The receiving controller 110 can store the unauthorized activity signature within the receiving controller's signature module 235 or policy engine 240. The policy engine 240 may use the unauthorized activity signature to scan network data received by the controller 110 to flag the network data as suspicious or containing unauthorized activity without any further analysis (by either the heuristic module 210 or the analysis environment 230.)

Optionally the unauthorized activity signature may be authenticated. In some embodiments, the analysis environment 230 can generate an authentication code along with the unauthorized activity signature. The authentication code can then be scanned to determine that the unauthorized activity signature is verified. In one example, the analysis environment 230 generates the unauthorized activity signature and an authentication code. The analysis environment 230 transmits the unauthorized activity signature and the authentication code to another controller 110. The controller 110 verifies the authentication code to ensure that the unauthorized activity signature is genuine. If the unauthorized activity signature is authenticated, then the signature module 235 stores the unauthorized activity signature.

The unauthorized activity signature can also be encrypted. In one example, the controller 110 generates, encrypts, and transmits the unauthorized activity signature to another controller 110. The receiving controller 110 can decrypt the unauthorized activity signature and store the unauthorized activity signature within the signature module 235. In some embodiments, the controller 110 generates an authentication code and proceeds to encrypt the authentication code and the unauthorized activity signature prior to transmitting the authentication code and the unauthorized activity signature to another controller 110.

Figure 7:
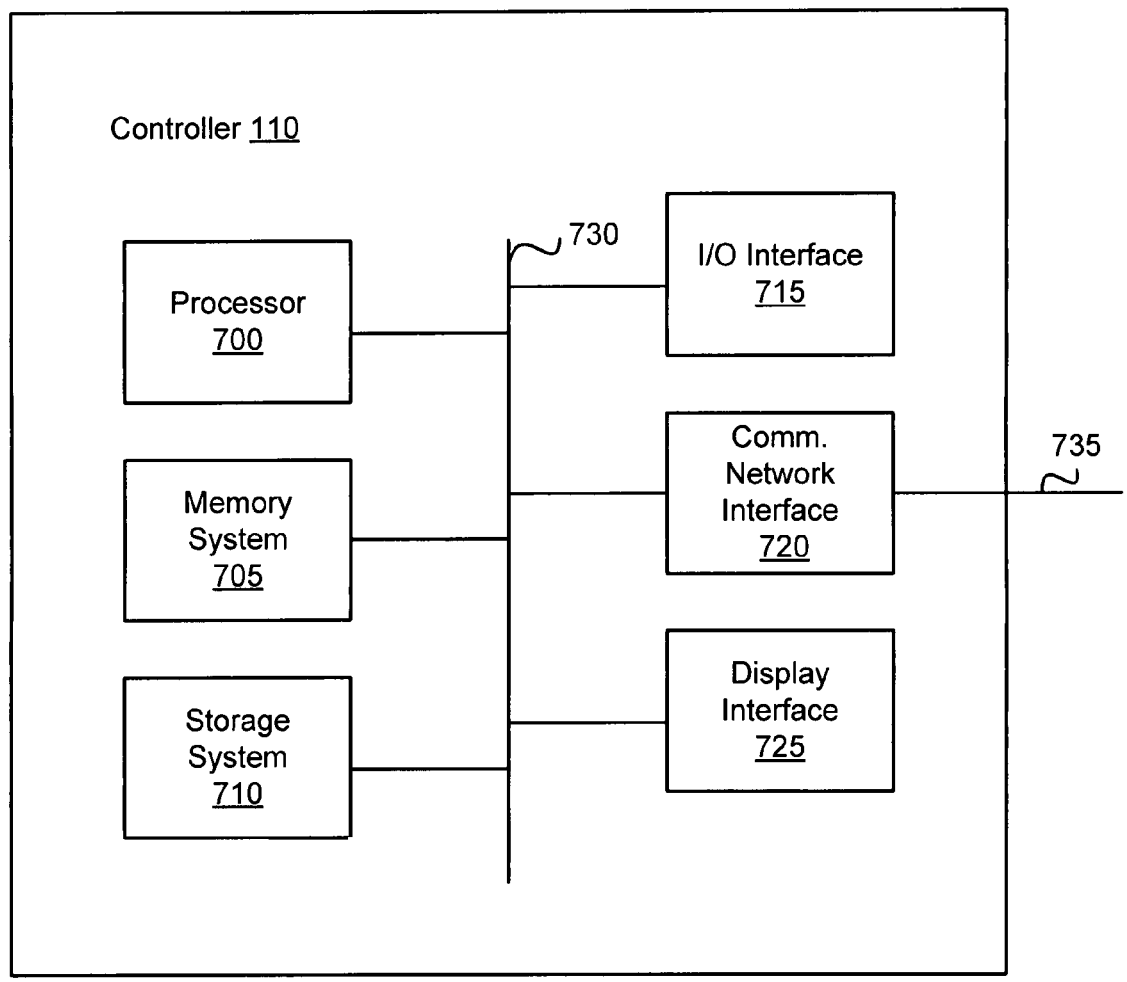
FIG. 7 is a block diagram of an exemplary controller in which embodiments of the present invention may be practiced.

FIG. 7 is a block diagram of the controller 110 (FIG. 1), in accordance with one embodiment of the present invention. The controller 110 comprises a processor 700, a memory system 705, a storage system 710, an I/O interface 715, a communication network interface 720, and a display interface 725 which are all coupled to a system bus 730. The processor 700 is configured to execute executable instructions. In some embodiments, the processor 700 comprises circuitry or any one or more processors capable of processing the executable instructions.

The memory system 705 is any memory configured to store data. Some examples of the memory system 705 include storage devices, such as RAM or ROM.

The storage system 710 is any storage configured to retrieve and store data. Some examples of the storage system 710 are flash drives, hard drives, optical drives, and/or magnetic tape. The storage system 710 can comprise a database or other data structure configured to hold and organize data (e.g., network data, copies of network data, buffered data.) In some embodiments, the controller 110 includes memory 705 in the form of RAM and storage 710 in the form of flash data. The memory system 705 and/or the storage system 710 can comprise cache and buffers configured to retain network data or copies of network data.

The input/output (I/O) interface 715 is any device that can receive input and provide output to a user. The I/O interface 715 can be, but is not limited to, a keyboard, a mouse, a touchscreen, a keypad, a biosensor, or floppy disk drive.

The communication network interface 720 can be coupled to any user device via the links 735. The communication network interface 720 may support communication over a USB connection, a firewire connection, an Ethernet connection, a serial connection, a parallel connection, or an ATA connection. The communication network interface 720 may also support wireless communication (e.g., 802.11a/b/g/n or wireless USB). It will be apparent to those skilled in the art that the communication network interface 720 can support many wired and wireless standards.

The display interface 725 is an interface configured to support a display, monitor, or screen. In some embodiments, the controller 110 comprises a graphical user interface to be displayed to a user over a monitor in order to allow the user to control the controller 110.

The above-described modules can be comprised of instructions that are stored on storage media. The instructions can be retrieved and executed by a processor (e.g., the processor 700). Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A malware containment method comprising:
 detecting a digital device upon connection with a communication network;
 quarantining network data from the digital device for a predetermined period of time by configuring a switch to direct the network data from the digital device to a controller;
 transmitting a command to the digital device to activate a security program to identify security risks;
 analyzing the quarantined network data to identify malware within the digital device, the analyzing of the quarantined network data comprises (i) configuring a virtual machine to receive the network data and (ii) analyzing a response of the virtual machine to the network data to identify a malware attack; and
 storing a result of the quarantined network data analysis in memory.

2. The method of claim 1, further comprising receiving a security profile of the digital device from the security program.

3. The method of claim 1, further comprising transmitting a command to the digital device to update security files on the digital device.

4. The method of claim 1, further comprising transmitting a command to the digital device to configure security settings associated with the digital device.

5. The method of claim 1, wherein quarantining network data comprises Address Resolution Protocol (ARP) manipulation to direct the network data from the digital device to a controller.

6. The method of claim 1, wherein quarantining network data comprises configuring Dynamic Host Configuration Protocol (DHCP) services to direct the network data from the digital device to a controller.

7. The method of claim 1, further comprising generating an unauthorized activity signature based on the identification of the malware attack.

8. The method of claim 7, further comprising:
 storing the unauthorized activity signature; and
 sending the unauthorized activity signature to another digital device.

9. The method of claim 1, wherein analyzing the quarantined network data further comprises:
 conducting a heuristic analysis on the network data to identify network data containing suspicious data.

10. A malware containment system comprising:
 a controller for containing malware;
 a memory;
 a quarantine module stored in the memory, and executed by the controller to detect a digital device upon connection with a communication network and quarantine network data from the digital device for a predetermined period of time by configuring a switch to direct the network data to the controller;
 a security module stored in the memory, and executed by the controller to transmit a command to the digital device to activate a security program to identify security risks; and
 an analysis module stored in the memory, and executed by the controller to:
  analyze the quarantined network data to identify malware within the digital device by (i) configuring a virtual machine to receive the quarantined network data and (ii) analyzing a response of the virtual machine to the quarantined network data to identify a malware attack, and
  store a result of the quarantined network data analysis in memory.

11. The system of claim 10, wherein the security module is further executed to receive a security profile of the digital device from the security program.

12. The system of claim 10, wherein the security module is further executed to transmit a command to the digital device to update security files on the digital device.

13. The system of claim 10, wherein the security module is further executed to transmit a command to the digital device to configure security settings associated with the digital device.

14. The system of claim 10, wherein the quarantine module is further executed to manipulate Address Resolution Protocol (ARP) to direct the network data from the digital device to the controller.

15. The system of claim 10, wherein the quarantine module is further executed to configure Dynamic Host Configuration Protocol (DHCP) services to direct the network data from the digital device to the controller.

16. The system of claim 10, further comprising a signature module stored in the memory, and executed by the controller to generate an unauthorized activity signature based on the identification of the malware attack.

17. The system of claim 16, wherein the signature module is further executed to:
    store the unauthorized activity signature; and
    send the unauthorized activity signature to another digital device.

18. The system of claim 10, further comprising:
    a heuristic module stored in the memory, and executed by the controller to analyze the quarantined network data by conducting a heuristic analysis on the network data to identify quarantined network data containing suspicious data; and
    a scheduler stored in the memory, and executed by the controller to retrieve the virtual machine.

19. A non-transitory machine readable medium having embodied thereon executable code, the executable code being executed by a processor for performing a method for malware containment, the method comprising:
    detecting a digital device upon connection with a communication network;
    quarantining network data from the digital device for a predetermined period of time by configuring a switch to direct the network data from the digital device to a controller;
    transmitting a command to the digital device to activate a security program to identify security risks;
    analyzing the quarantined network data to identify malware within the digital device, the analyzing of the quarantined network data comprises (i) configuring a virtual machine to receive the network data and (ii) analyzing a response of the virtual machine to the network data to identify a malware attack; and
    storing a result of the quarantined network data analysis in memory.

20. The non-transitory machine readable medium of claim 19, wherein the method further comprises receiving a security profile of the digital device from the security program.

21. The non-transitory machine readable medium of claim 19, wherein the method further comprises transmitting a command to the digital device to update security files on the digital device.

22. The non-transitory machine readable medium of claim 19, wherein the method further comprises transmitting a command to the digital device to configure security settings associated with the digital device.

23. The non-transitory machine readable medium of claim 19, wherein quarantining network data comprises Address Resolution Protocol (ARP) manipulation to direct the network data from the digital device to a controller.

24. The machine readable code of claim 19, wherein quarantining network data comprises configuring Dynamic Host Configuration Protocol (DHCP) services to direct the network data from the digital device to a controller.

25. The method of claim 1, wherein the quarantining of the network data continues until the predetermined period of time expires without evidence of suspicious activity being detected during the predetermined period of time.

26. The method of claim 1 further comprising:
    after the predetermined time has expired without suspicious activity, stopping quarantining of the network data from the digital device so that the network data is transmitted from the digital device to an intended recipient device.

27. The method of claim 9, wherein if the heuristic analysis determines that the network data is associated with suspicious activity within the predetermined period of time, continuing to quarantine the network data beyond the predetermined period of time.

28. The method of claim 9, wherein if the heuristic analysis fails to determine, within the predetermined period of time, that suspicious activity associated with the network data is present, the controller causing the network data to be re-transmitted to an intended recipient device.

29. The method of claim 1, wherein the command to activate the security program is a command to activate an antivirus program configured to identify virus.

30. The method of claim 1, wherein the detecting of the digital device comprises detecting a request from the digital device for network services.

31. The method of claim 1, wherein:
    the detecting of the digital device comprises assigning an Internet Protocol (IP) address to the digital device based on a request from the digital device for the IP address; and
    quarantining of the network data from the digital device comprises quarantining the network data sent over the communication network from the IP address assigned to the digital device.

32. The method of claim 1, wherein the predetermined period of time is set by a user using a user interface.

33. The method of claim 9, wherein the heuristic analysis comprises performing at least one of a dark Internet Protocol (IP) heuristic analysis and a dark port heuristic analysis.

34. The method of claim 9, wherein the heuristic analysis comprises detecting suspicious activity based on an unauthorized activity signature.

35. The method of claim 9, wherein the heuristic analysis comprises detecting suspicious activity based on scanning at least one of a header and contents of a packet included in the network data.

36. The method of claim 1 further comprising:
    preventing transmission to an intended recipient device of each packet of the network data that is associated with detected suspicious activity beyond the predetermined period of time.

37. The method of claim 1, wherein the network data received by the virtual machine includes a plurality of data packets comprising at least one data flow, and, where any of the data packets of the at least one data flow is associated with a detected suspicious activity, preventing transmission of the data flow to an intended recipient device beyond the predetermined period of time.

38. The malware containment system of claim 18, wherein if the heuristic analysis performed by the heuristic module determines that the network data is associated with suspicious activity within the predetermined period of time, continuing to quarantine the network data beyond the predetermined period of time.

39. The malware containment system of claim 10, wherein the predetermined period of time is set by a user using a user interface.

40. The malware containment system of claim 18, wherein the heuristic analysis performed by the heuristic module comprises performing at least one of a dark Internet Protocol (IP) heuristic analysis and a dark port heuristic analysis.

41. The malware containment system of claim 10, wherein the network data received by the virtual machine includes a plurality of data packets comprising at least one data flow, and, where any of the data packets of the at least one data flow is associated with a detected suspicious activity, preventing transmission of the data flow to the intended recipient device beyond the predetermined period of time.

42. The non-transitory machine readable medium of claim 19, wherein the analyzing of the quarantined network data further comprises conducting a heuristic analysis on the network data to determine if the network data is associated with suspicious activity within the predetermined period of time, and if so, continuing to quarantine the network data beyond the predetermined period of time.

* * * * *